(12) United States Patent
Nakata et al.

(10) Patent No.: US 7,061,834 B2
(45) Date of Patent: Jun. 13, 2006

(54) OPTICAL HEAD AND DISK RECORDING AND REPRODUCING APPARATUS

(75) Inventors: Hideki Nakata, Soraku-gun (JP);
Hironori Tomita, Ikoma (JP);
Takayuki Nagata, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 673 days.

(21) Appl. No.: 10/293,690

(22) Filed: Nov. 12, 2002

(65) Prior Publication Data

US 2003/0090985 A1  May 15, 2003

(30) Foreign Application Priority Data

Nov. 12, 2001  (JP) .............................. 2001-345585

(51) Int. Cl.
*G11B 7/00* (2006.01)
*G11B 7/135* (2006.01)

(52) U.S. Cl. ................................ 369/44.23; 369/112.23

(58) Field of Classification Search ........... 369/112.23, 369/44.22, 44.23; 359/637, 824
See application file for complete search history.

(56) References Cited

U.S. PATENT DOCUMENTS

| | | | | |
|---|---|---|---|---|
| 4,011,400 A * | 3/1977 | Simons et al. | ......... | 369/112.23 |
| 4,123,652 A * | 10/1978 | Bouwhuis | ............... | 369/112.23 |
| 5,636,189 A * | 6/1997 | Park | ....................... | 369/112.23 |
| 5,835,475 A * | 11/1998 | Kawakami et al. | ....... | 369/44.23 |
| 6,055,076 A * | 4/2000 | Takahashi et al. | ..... | 369/112.23 |
| 6,088,170 A * | 7/2000 | Lee et al. | ................... | 359/710 |
| 6,160,646 A * | 12/2000 | Takahashi et al. | ........ | 369/44.23 |
| 6,167,018 A * | 12/2000 | Morimoto et al. | ........ | 369/44.23 |
| 6,256,272 B1 * | 7/2001 | Yoon | ........................ | 369/44.23 |
| 6,392,971 B1 * | 5/2002 | Takiguchi et al. | ........ | 369/44.25 |
| 6,434,104 B1 * | 8/2002 | Asoma | ..................... | 369/44.23 |
| 6,788,628 B1 * | 9/2004 | Katayama | ................ | 369/44.23 |
| 2001/0022768 A1 * | 9/2001 | Takahashi | .............. | 369/112.23 |

FOREIGN PATENT DOCUMENTS

| | | |
|---|---|---|
| JP | 8-68903 | 3/1996 |
| JP | 2000-048374 | 2/2000 |

* cited by examiner

*Primary Examiner*—Andrea Wellington
*Assistant Examiner*—Nathan Danielsen
(74) *Attorney, Agent, or Firm*—Hamre, Schumann, Mueller & Larson, P.C.

(57) ABSTRACT

An optical head and a disk recording and reproducing apparatus using the same. The optical head can realize a stable recording and reproducing with less cross-talk and can be made small and thin by making the objective lens to be small and thin. The optical head includes an optical system including a light source having astigmatic difference and an objective lens that forms an optical spot on an information recording medium. The optical system has optical properties in that the optical spot has an initial astigmatism on the design optical axis, the direction of the initial astigmatism is a direction in which a back-side line focus is substantially perpendicular to the radial direction of the information recording medium, and astigmatism is generated in the direction in which the initial astigmatism of the optical spot is reduced as the objective lens moves in the direction in which the objective lens is more distant from the design optical axis in the radial direction. The direction of astigmatism of the optical spot formed by the objective lens is a direction in which a back-side line focus is substantially perpendicular to the radial direction in the radial direction movement range of the objective lens.

23 Claims, 21 Drawing Sheets

Current applied to coil 18b

Drive waveform of objective lens driving device 14
Time (Moving amount of objective lens 11)
Feeding amount Voltage applied to feeding motor 38

Waveform of driving voltage of feeding motor 38
Time

Amount of defocus (Voltage amount or μm)

Time (Moving amount of objective lens 11 in radial direction)

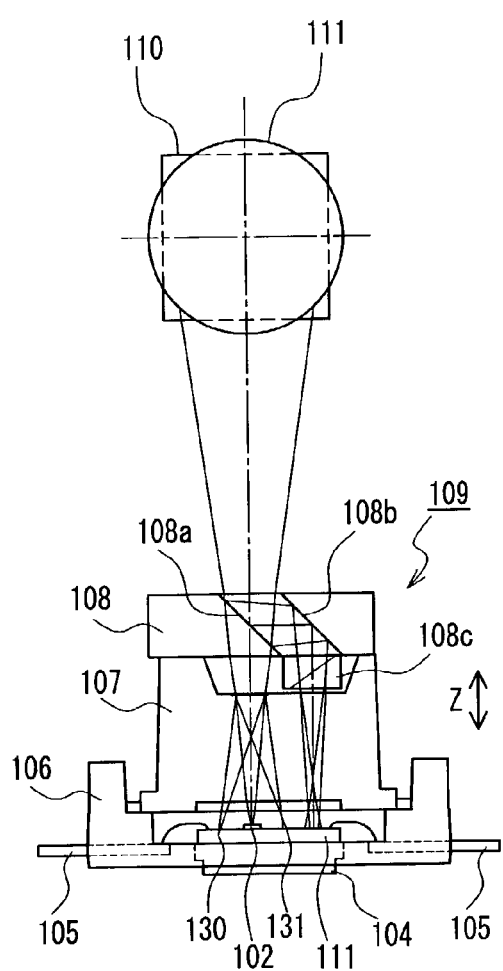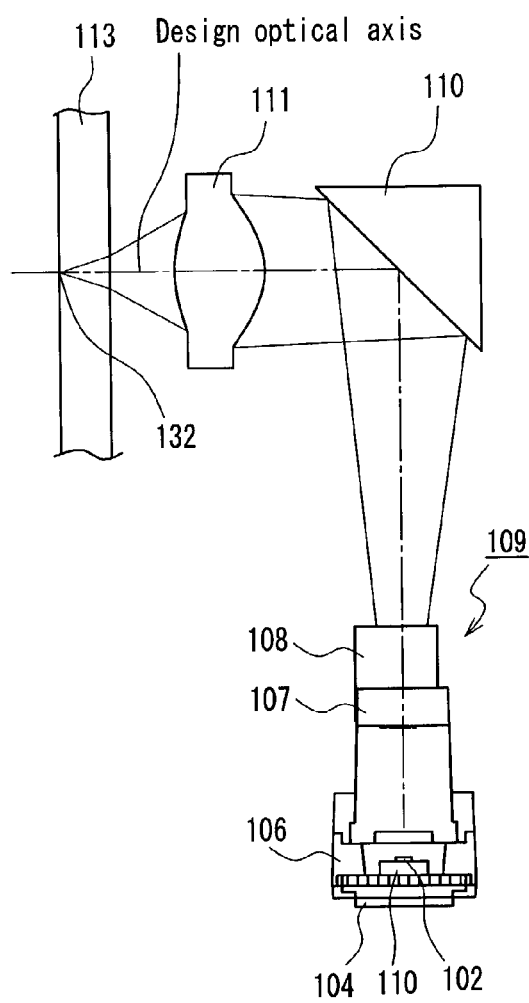
FIG. 17A
PRIOR ART
FIG. 17B
PRIOR ART

OPTICAL HEAD AND DISK RECORDING AND REPRODUCING APPARATUS

BACKGROUND OF THE INVENTION

1. Field of the Invention

The present invention relates to an optical head of a disk recording and reproducing apparatus in which an optical spot is projected onto a disk-shaped information recording medium, thereby recording and reproducing information optically.

2. Description of the Prior Art

Recently, an optical head and a disk recording and reproducing apparatus have been used for various applications, for example, DVD, MD, CD, CD-R, etc., an apparatus having a high density, high performance, high quality, and high added value have been demanded. In particular, in the magneto-optical disk recording and reproducing device using a magneto-optical media capable of recording, demands for portable type apparatus tend to greatly increase. Consequently apparatus having a small size, thin shape, high performance and low cost has been increasingly demanded.

Hitherto, a great deal of investigation concerning techniques for an optical head of a disk recording and reproducing apparatus for magneto-optical disk has been reported. The following is an explanation for one example of a conventional optical head of a disk recording and reproducing apparatus for magneto-optical disk with reference to the drawings. FIGS. 14, 15, 16, 17 and 18 are views to illustrate a schematic configuration and the operation principle thereof.

In FIGS. 14, 15, 16, 17 and 18, reference numeral 101 denotes a silicon substrate. 102 denotes a semiconductor laser light source fixed on the silicon substrate 101. 103 denotes a multifractionated photodetector formed on the silicon substrate 101 by an IC process. 104 denotes a radiator plate for holding the silicon substrate 101 in a state of transferring heat. 105 denotes a terminal wired from the multifractionated photodetector via a wire bonding, etc. 106 denotes a resin package holding the silicon substrate 101, the radiator plate 104 and the terminal 105. 107 denotes a hologram element (diffraction grating) formed of resin. 108 denotes a composite element including a beam splitter 108a, a mirror 108b and a polarization dividing element 108c.

Furthermore, in this configuration, the silicon substrate 101, the semiconductor laser 102, the multifractionated photodetector 103, the radiator plate 104, the terminal 105, the resin package 106, the hologram element 107 and the composite element 108 are defined as an integrated unit 109. Reference numeral 110 denotes a reflection mirror. 111 denotes an objective lens. 112 denotes an objective lens holder to which the objective lens 111 is fixed. 113 denotes a magneto-optical recording medium that is an information recording medium having a magneto-optical effect. 114 denotes an objective lens driving device for driving the objective lens 111 in the focus direction (the direction substantially vertical to the magneto-optical recording medium 113) and in the radial direction (the direction substantially parallel to the magneto-optical recording medium 113) of the magneto-optical recording medium 113.

The objective lens driving device 114 includes components such as the objective lens 111 forming an optical spot on the magneto-optical disk by using a light flux released from the semiconductor laser 102, the objective lens holder 112, a base 115, a suspension 116, a magneto-optical circuit 117 and coils 118a and 118b. By electrifying the coil 118a, the objective lens 111 can be driven in the focus direction, and by electrifying the coil 118b, the objective lens 111 can be driven in the radial direction. Reference numeral 119 denotes an optical bench, which fixes the reflection mirror 110.

Furthermore, the integrated unit 109 is fixed by bonding the optical bench 119 to the resin package 106. As a result, the position of the optical bench 119 is determined so that the multifractionated photodetector 103 is positioned in the Z-axis direction (direction of the optical axis) in the position in which the region 124 of receiving a focus error signal is positioned substantially in the middle between the focuses 130 and 131 of the optical spot.

On the other hand, in FIG. 18, reference numeral 120 denotes an optical spot for detecting a focus error signal, formed on the multifractionated photodetector 103. 121 denotes an optical spot for detecting a tracking error signal formed on the multifractionated photodetector 103. 122 denotes a main beam (P polarization) formed on the multifractionated photodetector 103. 123 denotes a main beam (S polarization) formed on the multifractionated photodetector 103. 124 denotes a region of receiving a focus error signal. 125 and 126 are regions for receiving a tracking error signal, 127 denotes a region for receiving an information signal, 128 denotes a subtracter and 129 denotes an adder.

Furthermore, in FIG. 17, reference numerals 130 and 131 respectively are focuses of the optical spot for detecting a focus error signal and 132 denotes an optical spot formed on the magneto-optical recording medium 113.

In FIGS. 16A and 16B, reference numeral 133 denotes a cover, 134 denotes an adhesive and 135 denotes a flexible circuit.

Furthermore, as shown in FIG. 14, an optical head feeding device for moving the optical head in the radial direction of the magneto-optical recording medium 113 includes a feeding screw 136, a jackshaft 137, a feeding motor 138, a gear 139a, a gear 139b, a nut plate 140 formed on the cover 133, a bearing 141, and the like and is attached to a mecha base (a base on which a mechanism is disposed) 142 (details are not shown in the drawings). At this time, the nut plate 140 and the feeding screw 136 are fitted with each other, and the entire optical head moves in the radial direction due to the rotation of the feeding motor 138 by a feeding amount determined by the reduction ratio. The reduction ratio is determined by the gear ratio of a gear 139a to a gear 139b and by the pitch of the feeding screw 136.

Furthermore, at this time, the relative positions of the objective lens 111 and the optical bench 119 are displaced by the feeding amount. Furthermore, the maximum value of the radial direction moving amount of the objective lens 111 is a value right before the feeding motor 138 is rotated.

As shown in FIGS. 14, 15 and 20A–20C, the operation of the objective lens 111 at the time of recording or reproducing information on the inner periphery to the outer periphery of the magneto-optical recording medium 113 is explained. First of all, the objective lens 111 is positioned in the vicinity of the design optical axis. Then, electric current is applied to the coil 118b in order to move the objective lens 111 in the radial direction so that the objective lens 111 follows the track of the magneto-optical recording medium 113. Then, the voltage corresponding to the value of electric current applied to the coil 118b is applied to the feeding motor 138, and the feeding motor 138 is rotated when the voltage reaches a predetermined value, and thereby the feeding amount corresponding to the gear ratio determined by the gears 139a, 139b and the feeding screw 136 is applied to the optical head so as to drive the entire optical bench 119 in the outer peripheral direction. At this time, the relative displacement between the objective lens 111 and the optical bench 119 (or design optical axis) is a value obtained by subtracting the feeding amount of the optical head from the moving amount of the objective lens 111.

The following is an explanation of the operation of the conventional optical apparatus configured as mentioned above with reference to FIGS. 14, 15, 16, 17 and 18.

Light beams emitted from the semiconductor laser 102 are split into a plurality of different light fluxes by the hologram element 107. The plurality of different light fluxes pass through the beam splitter 108a of the composite element 108, are reflected by the reflection mirror 110 and converged into an optical spot 132 having a diameter of about 1 µm on the magneto-optical recording medium 113 by the objective lens 111 fixed to the objective lens holder 112.

Furthermore, a light flux reflected by the beam splitter 108a of the composite element 108 is incident in the laser monitor photo-receiving element (not shown) to control the driving current of the semiconductor laser 102.

The light beam reflected by the magneto-optical recording medium 113 travels in the opposite direction, is reflected and split by the beam splitter 108a of the composite element 108 and then is incident in the mirror 108b and a polarization splitting element 108c of the composite element 108.

The semiconductor laser 102 is provided in such a way that the polarization direction is parallel to the paper of the FIG. 17A. The incident light beams are split into two light fluxes having polarization components perpendicular to each other, and then are incident in the region 127.

Furthermore, the light fluxes that pass thorough the beam splitter 108a among the light beams reflected by the magneto-optical recording medium 113 are split into a plurality of light fluxes by a hologram element 107 and converged into the region 124 and the regions 125 and 126. The focus servo is carried out by a so-called SSD method and the tracking servo is carried out by a so-called push-pull method.

Furthermore, by calculating the difference between the main beam 122 including P polarization and the main beam 123 including S polarization, the magneto-optical disk information signal can be detected by the differential detection method. Furthermore, by calculating the sum of them, a pre-pit signal can be detected.

In the optical head configured as mentioned above, in order to obtain the desired detection signal by the use of the reflected light from the magneto-optical recording medium 113, the relative positions of the semiconductor laser 102, the objective lens 111 and the multifractionated photodetector 103 are adjusted during assembly. With reference to the adjustment of the relative positions, the setting of the initial location of the focus error signal is determined by specifying the dimension of the optical bench 119 and the resin package 106 of the integrated unit 109 so that the region 124 is located substantially in the middle of the focuses 130 and 131 of the optical spot.

Furthermore, as shown in FIGS. 16A and 16B, the adjustment of the tracking error signal is carried out so that outputs of the regions 125 and 126 are substantially uniform by maintaining the base 115 by the use of an external jig (not shown) and by moving the objective lens driving device 114 in the Y direction and the X direction.

This adjustment results in aligning the center of the axis of light emitted from the semiconductor laser 102 with respect to the center of the objective lens 111 in FIG. 17. Furthermore, the adjustment of the relative tilt of the magneto-optical recording medium 113 and the objective lens 111 is carried out by maintaining the base 115 by the use of an external jig (not shown) and carrying out the skew adjustment θR in the radial direction (around the Y axis) and the skew adjustment θT in the tangential direction (around the X axis). After the adjustment, the base 115 is fixed to the optical bench 119 by using adhesive 134. As mentioned above, the adjustment of the focus error signal and the tracking error signal and the skew adjustments are completed and thus the optical head is completed.

On the other hand, FIGS. 19A–19B show the focus servo of the optical head having a conventional configuration as mentioned above. In this configuration, the off-set amount to the GND with respect to the focus error signal calculated by the so-called SSD method and electric current corresponding to the off-set amount is applied to the coil 118b, and thus the focus servo is converged around the GND. The focus error signal generates a so-called S-letter signal due to the change of the position in the focus direction of the objective lens 111, and the focus point of the objective lens 111 is converged around the GND of the focus error signal. At this time, the defocus amount is defined by the difference between substantially the center of the S-letter signal and the GND as shown in FIG. 19B.

However, the optical system of the optical head having the above-mentioned conventional configuration is a so-called finite system. In this system, as the objective lens 111 moves in the radial direction of the magneto-optical recording medium 113 (in particular, with increasing distance from the design optical axis of the objective lens 111), the off-axis aberration on the optical spot 132 on the magneto-optical recording medium 113 and the change in the shape of the optical spot 120 for detecting a focus error signal on the region 124 are generated. Thus, displacement of the focus point of the optical spot 132 with respect to the magneto-optical recording medium 113 occurs, and thus defocus occurs as shown in FIG. 19B and FIG. 20C.

As shown in FIG. 21, when the objective lens 111 moves in the radial direction, off-axis aberration (wave aberration) includes astigmatism, coma-aberration, spherical aberration, high-order aberration, and the like. The most significant is astigmatism, and the defocus amount generated when the objective lens 111 moves in the radial direction increases as the radial direction moving amount of the objective lens 111 is large, and as the thickness of the objective lens 111 reduces. In particular, the optical head for a portable type disk recording and reproducing apparatus is required to be smaller and thinner, and as the objective lens 111 becomes smaller and thinner, the off-axis aberration increases.

Furthermore, when defocus occurs, the spot diameter of the optical spot 132 on the magneto-optical recording medium 113 becomes larger and the ellipticity of the spot increases. At this time, on the design optical axis (an optical axis having the radial direction shift amount of the objective lens 111 of 0 or a design optical axis of the objective lens 111), the direction of astigmatism at the optical spot 132 after released from the objective lens 111 by astigmatic difference of the semiconductor laser 102 is a direction in which the back-side line focus of the optical spot 132 substantially coincides with the radial direction. At the same time, as the objective lens 111 moves in the radial direction, the off-axis aberration (mainly astigmatism) increases. In particular, when the objective lens is thinned, in order to make the optical head small and thin, the off-axis (astigmatism) of the objective lens 111 increases.

Therefore, due to the defocus accompanied with the radial direction movement of the objective lens 111, the shape of the optical spot 132 on the magneto-optical recording medium 113 becomes an oval shape having a longitudinal axis in substantially the radial direction. When a groove neighboring a groove to be reproduced is irradiated with a part of the optical spot 132, there is a problem in that the recording and reproducing performance is deteriorated because of the reduction of the signal reading performance due to the increase of cross-talk when reproducing the information signal recorded on the magneto-optical recording medium 113 or because of the reduction of the reading performance by cross-talk of a wobble signal having address information, etc. (ADIP signal or ATIP signal) formed on the magneto-optical recording medium 113.

Furthermore, as shown in FIG. 21, in the small and thin lens, the off-axis aberration radically tends to increase. Therefore, with the increase of astigmatism, coma-aberration, spherical aberration or high-order aberration in accordance with the increase of the off-axis aberration and by the tilt of the objective lens, the optical performance is deteriorated radically with respect to the design axis. Thus, there is a problem in that the recording and reproducing performance is deteriorated radically. In FIG. 21, the degrees of the angle of view correspond to the moving amount of the objective lens 11.

With the foregoing in mind, it is an object of the present invention to provide an optical head capable of realizing a stable recording and reproducing with less cross-talk and capable of making the device to be small and thin by making the objective lens to be small and thin, and a disk recording and reproducing apparatus using the optical head.

SUMMARY OF THE INVENTION

In order to achieve the above-mentioned object, an optical head of the present invention includes a finite or pseudo-finite optical system including a light source having astigmatic difference and an objective lens that forms an optical spot on an information recording medium by a light flux emitted from the light source. The optical system has optical properties in that the optical spot has an initial astigmatism on the design optical axis, the direction of the initial astigmatism is a direction in which a back-side line focus is substantially perpendicular to the radial direction of the information recording medium, and astigmatism is generated in the direction in which the initial astigmatism of the optical spot is reduced as the objective lens moves in the direction in which the objective lens is more distant from the design optical axis in the radial direction. The direction of astigmatism of the optical spot formed by the objective lens is a direction in which a back-side line focus is substantially perpendicular to the radial direction in the radial direction moving range of the objective lens.

Next, the recording and reproducing apparatus of the present invention includes an optical head according to present invention and an optical head feeding device carrying out an intermittent feeding so that the radial direction moving amount of the objective lens falls in the acceptable range.

According to the optical head of the present invention, since the optical spot can be made vertically elongated with respect to the track when defocus occurs, it is possible to achieve a reproducing signal with less cross talk and minimize the influence of the off-axis aberration, and it is possible to make the objective lens to be small and thin. Thus, it is possible to make the optical head to be small and thin.

Furthermore, according to the disk recording and reproducing apparatus of the present invention, since the optical head of the present invention is provided, it is possible to improve the recording and reproducing performance and to realize a small and thin disk recording and reproducing apparatus.

In the above-mentioned optical head, it is preferable that the objective lens adds astigmatism so as to obtain the initial astigmatism. With such a configuration, without adding some special components, astigmatism can be added by a simple configuration.

Furthermore, it is preferable that the optical head includes an astigmatism generating member between the light source and the objective lens, wherein the astigmatism generating member adds astigmatism so as to obtain the initial astigmatism. With such a configuration, since an astigmatism generating member is provided in addition to the objective lens, it becomes easy to adjust the amount of astigmatism to be added, and thus the appropriate amount of correction can be applied with high precision.

Furthermore, it is preferable that the initial astigmatism is in the range of 30 mλ or more and 100 mλ or less. With such a configuration, it is possible to use an ultra thin objective lens with much generation of astigmatism in the radial direction moving range.

Furthermore, it is preferable that the absolute value of the radial direction moving range of the objective lens is in the range of 200 μm or more and 500 μm or less.

Furthermore, it is preferable that the changing amount of astigmatism generated in the moving amount in the radial direction moving range of the objective lens is in the range of 30 mλ or more and 100 mλ or less.

Furthermore, it is preferable that the light source comprises a semiconductor laser, and the direction of astigmatism of the optical spot emitted from the semiconductor laser is a direction in which a front-side line focus is substantially perpendicular to the radial direction.

Furthermore, it is preferable that the objective lens is a single lens formed of resin or glass, and the direction of astigmatism of the optical spot released from the objective lens on the design optical axis is a direction in which a back-side line focus is substantially perpendicular to the radial direction.

Furthermore, it is preferable that the objective lens is a single lens formed of resin or glass, and the direction of astigmatism of the optical spot generated by the astigmatism generating member on the design optical axis is a direction in which a back-side line focus is substantially perpendicular to the radial direction.

Furthermore, it is preferable that the astigmatism generating member is a flat-shaped glass or a cylindrical-shaped lens. With such a configuration, by only changing the angle of the flat-shaped glass or cylindrical-shaped lens, it is possible to adjust the added astigmatism, thus applying the appropriate correction amount with high precision easily.

In the above-mentioned disk recording and reproducing apparatus of the present invention further includes a feeding amount detector of the objective lens in the radial direction, wherein the feeding amount detector carries out an intermittent feeding when the moving amount reaches the predetermined moving amount.

Furthermore, it is preferable that the calculation of the feeding amount detector uses a part of the tracking error signals.

Furthermore, it is preferable that the calculation of the feeding amount detector uses the applied current of the objective lens driving device for driving the objective lens in the radial direction.

BRIEF DESCRIPTION OF THE DRAWINGS

FIG. 17 is a view showing an optical path of an optical head according to the prior art.

DESCRIPTION OF THE PREFERRED EMBODIMENTS

Figure 1:
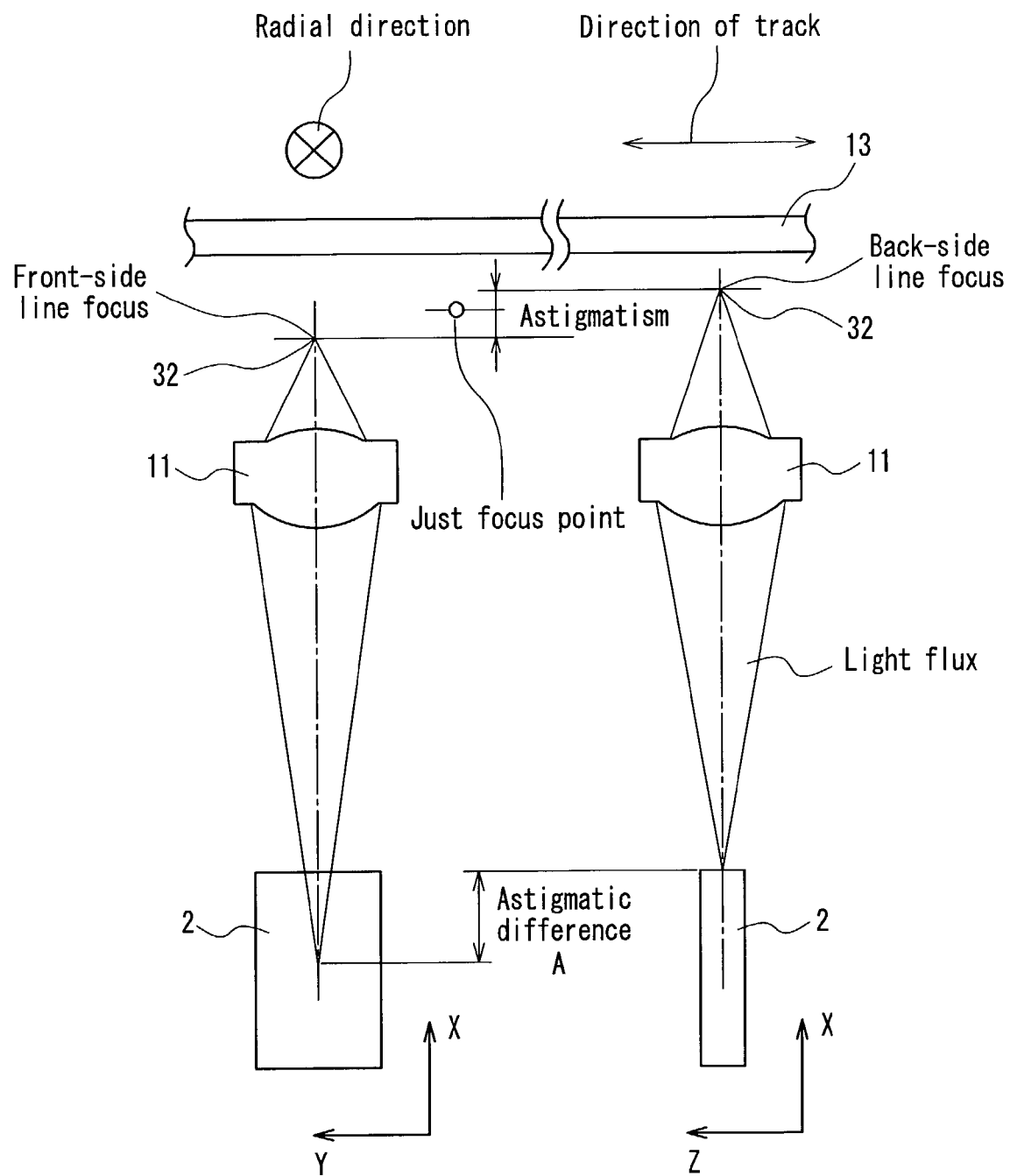
FIG. 1 is a schematic view showing an optical path of an optical head according to a first embodiment of the present invention.

Hereinafter, the present invention will be explained in detail by way of embodiments with reference to the accompanying drawings.

First Embodiment

In FIGS. 1 to 6, reference numeral 1 denotes a silicon substrate, 2 denotes a semiconductor laser that is a light source fixed to the silicon substrate 1 and 3 denotes a multifractionated photodetector disposed on the silicon substrate 1. The multifractionated photodetector 3 is formed by, for example, an IC process, etc. Reference numeral 4 denotes a radiator plate for holding the silicon substrate 1 in a state of transferring heat. 5 denotes a terminal wired to the multifractionated photodetector via a wire bonding, etc. 6 denotes a resin package for holding the silicon substrate 1, the radiator plate 4 and the terminal 5. 7 denotes a hologram element (diffraction grating) formed of resin. 8 denotes a composite element including a beam splitter 8a, a mirror 8b and a polarization splitting element 8c.

Reference numeral 9 denotes an integrated unit in which the silicon substrate 1, the semiconductor 2, the multifractionated photodetector 3, the radiator plate 4, the terminal 5, the resin package 6, the hologram element 7 and the composite element 8 are integrated.

Reference numeral 10 denotes a reflection mirror. Reference numeral 11 denotes an objective lens and reference numeral 12 denotes an objective lens holder fixing the objective lens 11. The objective lens 11 forms an optical spot 32 on a magneto-optical disk mentioned below by using the light fluxes emitted from the semiconductor laser 2. Reference numeral 13 denotes a magneto-optical recording medium having a magneto-optical effect.

The semiconductor laser 2 has an astigmatic difference and the amount of this astigmatic difference is represented by A.

Reference numeral 14 denotes an objective lens driving device for driving the objective lens 11 in the focus direction and radial direction of the magneto-optical recording medium 13.

Figure 3:
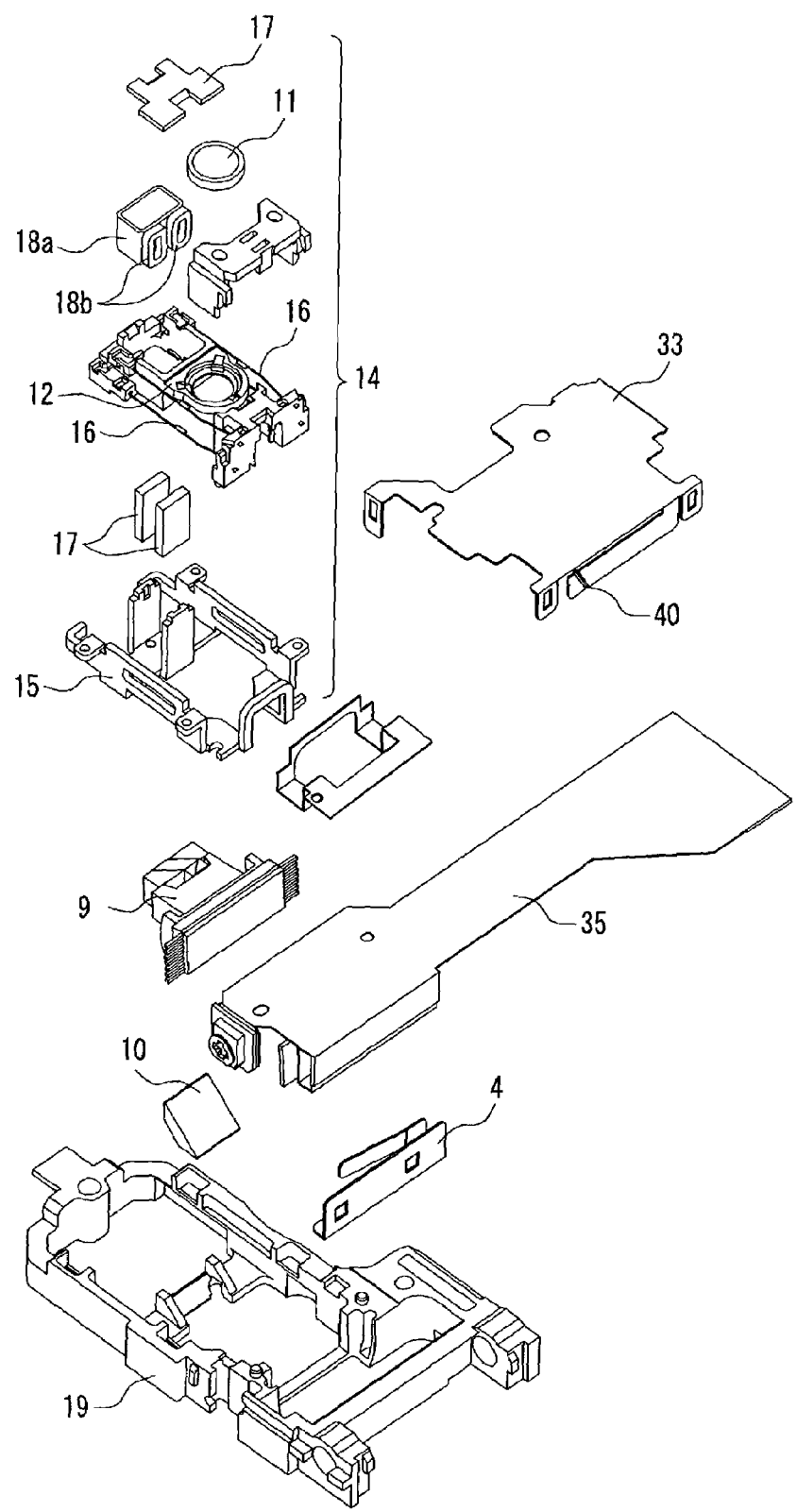
FIG. 3 is a perspective exploded view showing a configuration of an optical head according to the first embodiment.

The objective lens driving device 14 shown in FIG. 4 includes components such as the objective lens 11, the objective lens holder 12, the base 15, the suspension 16, the magneto-optical circuit 17 and coils 18a and 18b as shown in FIG. 3. By electrifying the coil 18a, the objective lens 11 can be driven in the focus direction, and by electrifying the coil 18b, the objective lens 11 can be driven in the radial direction.

Reference numeral 19 denotes an optical bench, to which the reflection mirror 10 is fixed. Furthermore, the integrated unit 9 is fixed by bonding the optical bench 19 to the resin package 6. As a result, the position of the optical bench 19 is determined so that the multifractionated photodetector 3 in the Z-axis direction (direction of the optical axis) is positioned in the position in which the region 24 of receiving a focus error signal is positioned substantially in the middle between the focuses 30 and 31 of the optical spot.

On the other hand, reference numeral 20 denotes an optical spot for detecting a focus error signal formed on the multifractionated photodetector 3. 21 denotes an optical spot for detecting a tracking error signal formed on the multifractionated photodetector 3. 22 denotes a main beam (P polarization) formed on the multifractionated photodetector 3. 23 denotes a main beam (S polarization) formed on the multifractionated photodetector 3. 24 denotes a region of receiving a focus error signal. 25 and 26 are regions for receiving a tracking error signal. 27 denotes a region of receiving an information signal, 28 denotes a subtracter. 29 denotes an adder. 30 and 31 respectively denote a focus of an optical spot for detecting a focus error signal. 32 denotes an optical spot formed on the magneto-optical recording medium 13. 33 denotes a cover. 34 denotes adhesives and 35 denotes a flexible circuit.

Furthermore, an optical head feeding device for moving the optical head in the radial direction of the magneto-optical recording medium 13 includes a feeding screw 36, a jackshaft 37, a feeding motor 38, a gear 39a, a gear 39b, a nut plate 40 formed on the cover 33, a bearing 41, and the like and is attached to a mecha base 42 (details are not shown in the drawings).

At this time, the nut plate 40 and the feeding screw 36 fitted with each other, and the entire optical head moves in the radial direction due to the rotation of the feeding motor 38 by a feeding amount determined by the reduction ratio. The reduction ratio is determined by the gear ratio of a gear 39a to a gear 39b and by the pitch of the feeding screw 36. Furthermore, at this time, the relative positions of the objective lens 11 and the optical bench 19 are displaced by the feeding amount. Furthermore, the maximum value of the radial direction moving amount of the objective lens 11 is a value right before the feeding motor 38 is rotated.

Figure 2:
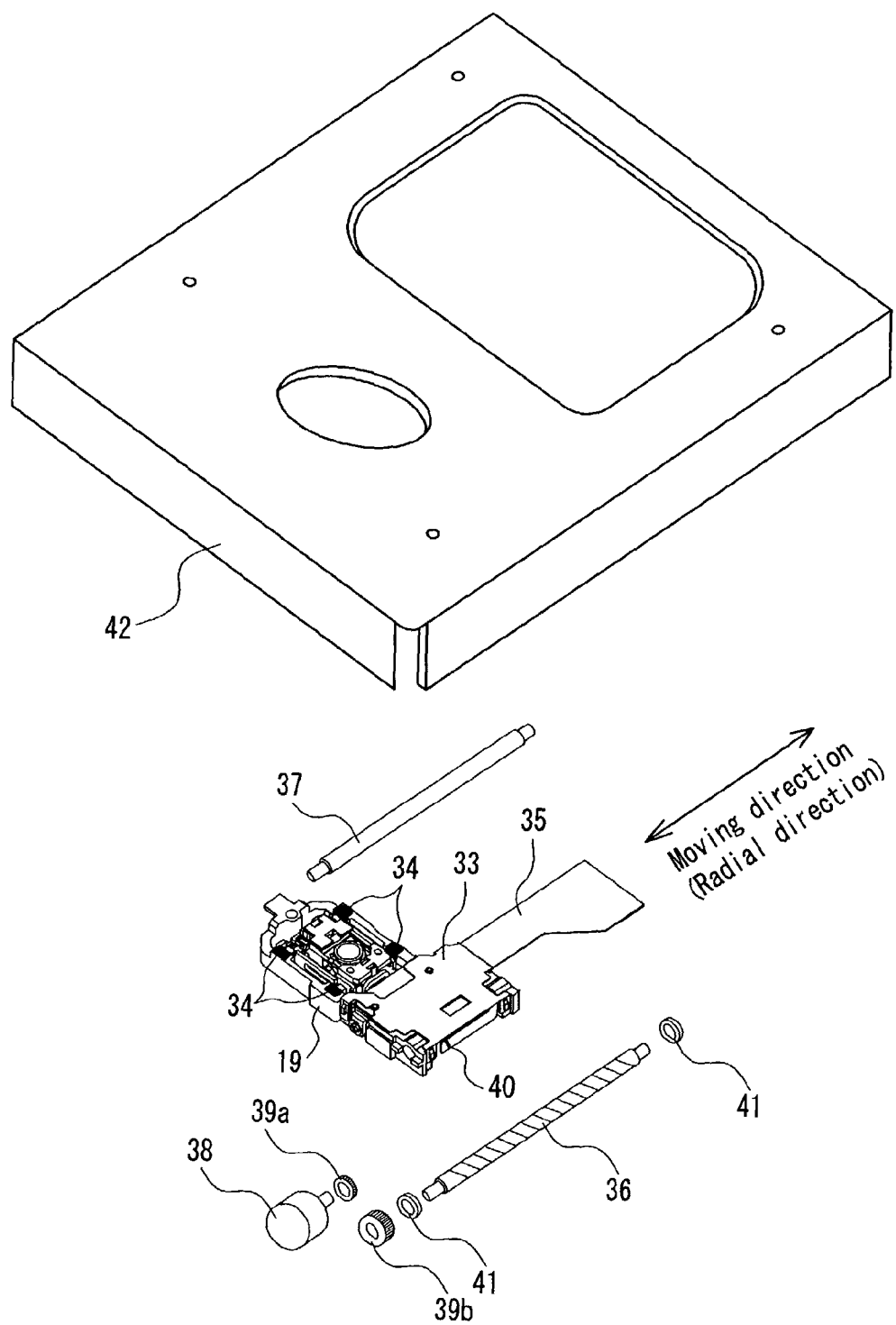
FIG. 2 is a perspective view showing an optical head and an optical head feeding apparatus according to the first embodiment.

As shown in FIGS. 2, 3 and 9, the operation of the objective lens 11 at the time of recording or reproducing information on the inner periphery to the outer periphery of the magneto-optical recording medium 13 is explained. First of all, the objective lens 11 is positioned in the vicinity of the design optical axis. Then, electric current is applied to the coil 18b in order to move the objective lens 11 in the radial direction so that the objective lens 11 follows the track of the magneto-optical recording medium 13. Then, the voltage corresponding to the value of the electric current applied to the coil 18b is applied to a feeding motor 38. When the voltage reaches a predetermined value, the feeding motor 38 is rotated, and thereby the feeding amount corresponding to the gear ratio determined by the gears 39a, 39b and the feeding screw 36 is applied to the optical head so as to drive the entire optical bench 19 in the direction toward the outer peripheral direction. At this time, the relative displacement between the objective lens 11 and the optical bench 19 (or design optical axis or a central axis of the objective lens) is a value obtained by subtracting the feeding amount of the optical head from the moving amount of the objective lens 11. At this time, from the viewpoint of the consumption electric power, it is preferable that only the objective lens driving device 14 is moved so as to follow the track of the magneto-optical recording medium 13 and to move the objective lens 11 in the radial direction without operating the feeding motor 38 as long as it is possible in terms of the performance.

Hereinafter, the operation of the first embodiment configured as mentioned above will be explained with reference to FIGS. 1, 2, 3, 4, 5 and 6.

Light beams emitted from the semiconductor laser 2 are split into a plurality of different light fluxes by the hologram element 7. The plurality of different light fluxes pass through the beam splitter 8a of the composite element 8, are reflected by the reflection mirror 10 and converged into an optical spot 32 having a diameter of about 1 µm on the magneto-optical recording medium 13 by the objective lens 11 fixed to the objective lens holder 12.

Furthermore, light fluxes reflected by the beam splitter 8a of the composite element 8 are incident in a laser monitor photo-receiving element (not shown) to control the driving current of the semiconductor laser 2.

The light beam reflected by the magneto-optical recording medium 13 travels in the opposite direction, is reflected and split by the beam splitter 8a of the composite element 8 and then is incident in the mirror 8b and a polarization splitting element 8c of the composite element 8.

Figure 5A:
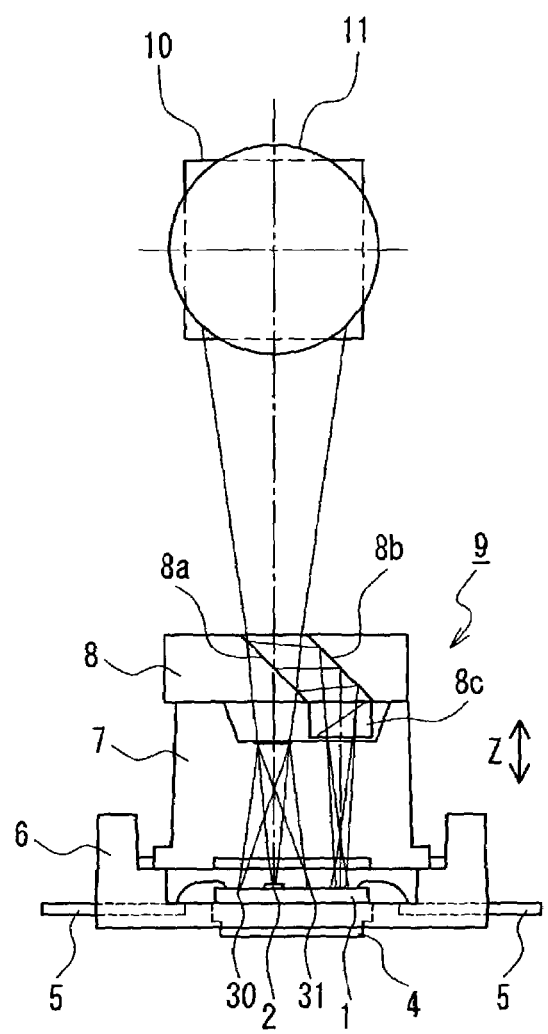
FIG. 5 is a view showing an optical path of the optical head according to the first embodiment.
Figure 5B:
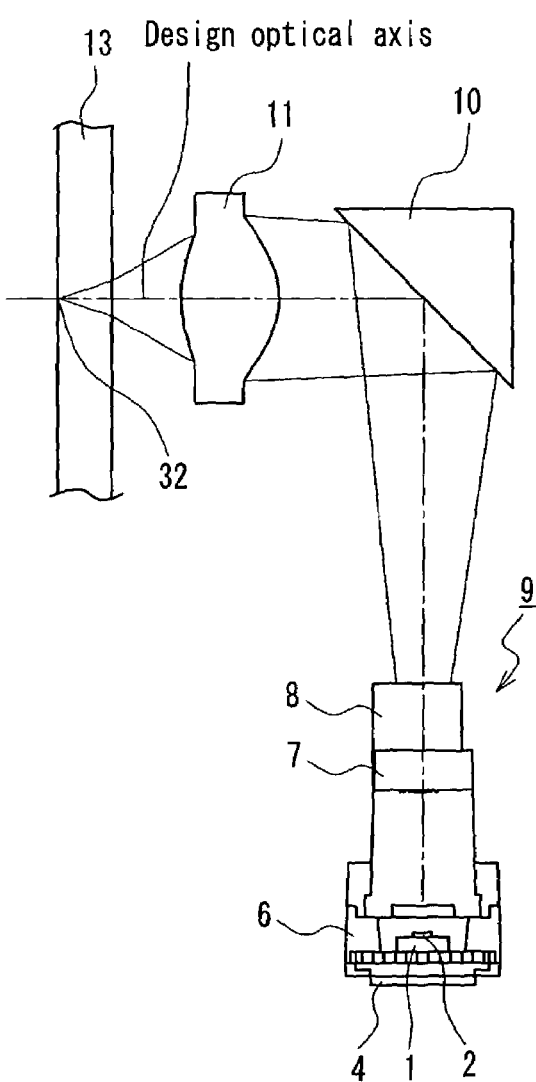
Figure 6:
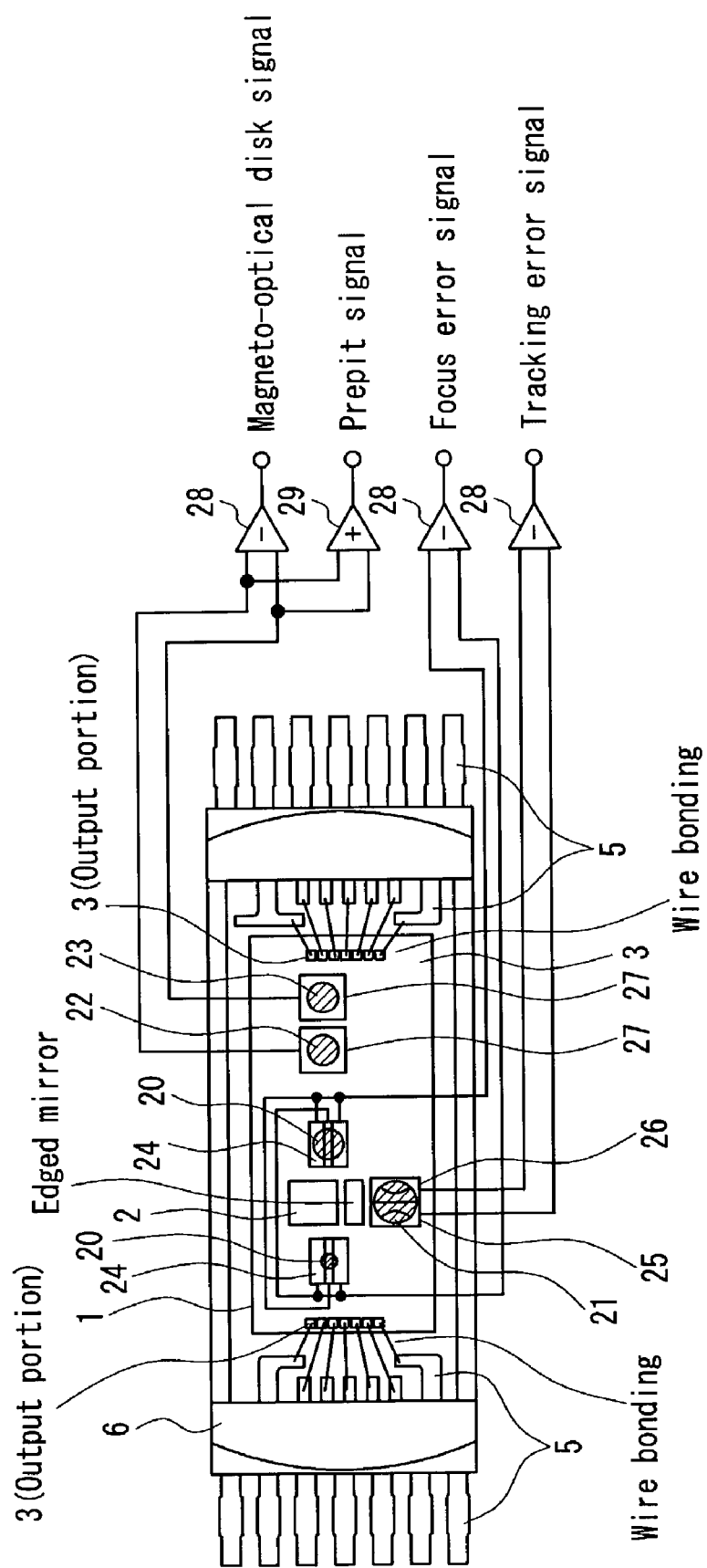
FIG. 6 is a schematic view showing a light receiving and emitting element of the optical head according to the first embodiment.

The semiconductor laser 2 is provided in such a way that the polarization direction is parallel with respect to the paper of the FIG. 5A. The incident light beams are split into two light fluxes having polarization components, which are perpendicular to each other, by the polarization splitting element 8c and then incident in the region 27 shown in FIG. 6.

Furthermore, the light fluxes that pass thorough the beam splitter 8a among the light reflected by the magneto-optical recording medium 13 are split into a plurality of light fluxes by a hologram element 7 and converged into the region 24 and the regions 25 and 26. The focus servo is carried out by a so-called SSD method and the tracking servo is carried out by a so-called push-pull method.

Furthermore, by calculating the difference between the main beam 22 including P polarization and the main beam 23 including S polarization, the magneto-optical disk information signal can be detected by the differential detection method. Furthermore, by calculating the sum of them, the pre-pit signal can be detected.

In the optical head configured as mentioned above, in order to obtain the desired detection signal by using the reflected light from the magneto-optical recording medium 13, the relative positions of the semiconductor laser 2, the objective lens 11 and the multifractionated photodetector 3 are adjusted during assembly. With reference to the adjustment of the relative positions, the setting of the initial position of the focus error signal is determined by specifying the dimension of the optical bench 19 and the resin package 6 of the integrated unit 9 so that the region 24 is positioned substantially in the middle of the focuses 30 and 31 of the optical spot.

Figure 4B:
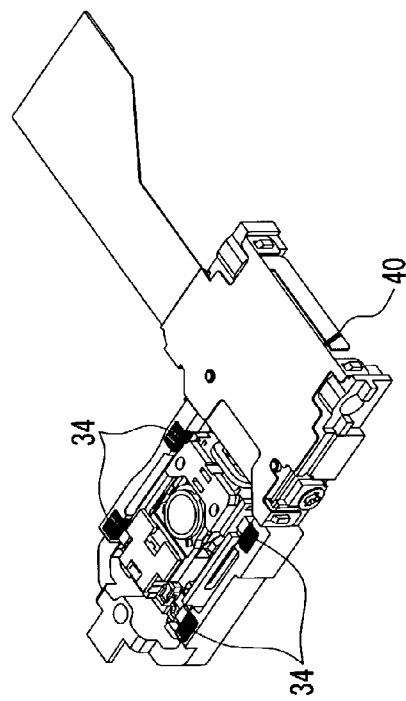
FIG. 4 is a perspective view showing a method for adjusting the optical head according to the first embodiment.
Figure 4A:
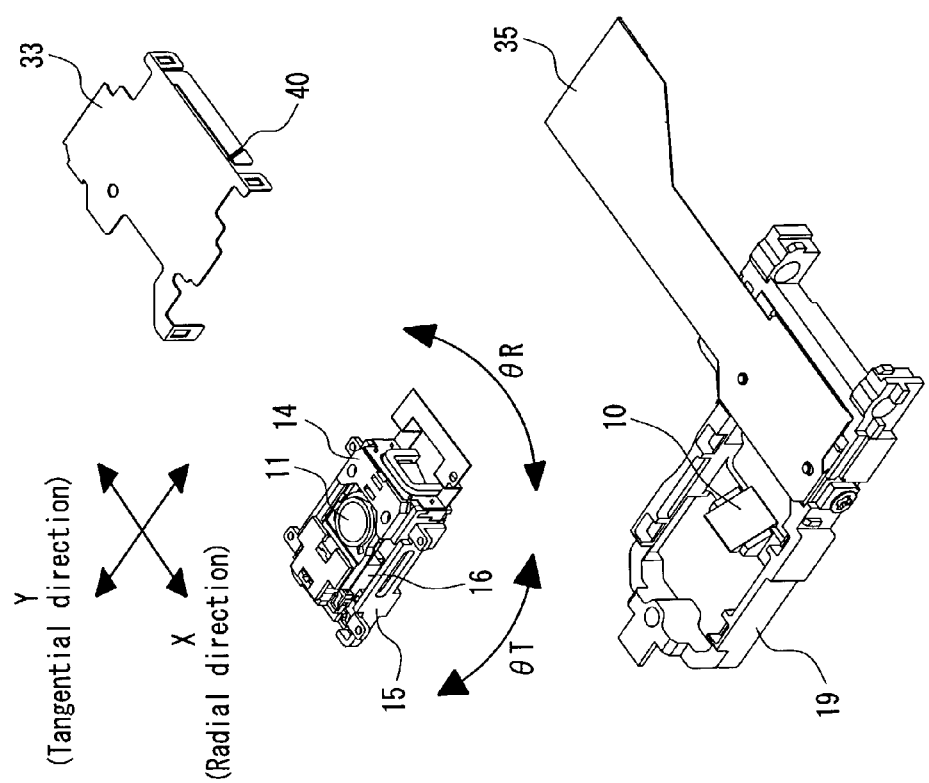

Furthermore, as shown in FIGS. 4A and 4B, the adjustment of the tracking error signal is carried out so that outputs of the regions 25 and 26 are substantially uniform by maintaining the base 15 by the use of an external jig (not shown) and by moving the objective lens driving device 14 in the Y direction and the X direction. This adjustment results in aligning the center of the optical axis of light emitted from the semiconductor laser 2 with respect to the center of the optical axis of the objective lens 11 in FIG. 4A.

Furthermore, the adjustment of the relative tilt of the magneto-optical recording medium 13 and the objective lens 11 is carried out by maintaining the base 15 by the use of an external jig (not shown) and carrying out the skew adjustment $\theta R$ in the radial direction (around the Y axis) and the skew adjustment $\theta T$ in the tangential direction (around the X axis). After adjustment, the base 15 is adhered to the optical bench 19 with adhesive 34. As mentioned above, the adjustment of the focus error signal, the tracking error signal and the skew adjustment are completed and thus the optical head is completed.

Figure 7A:
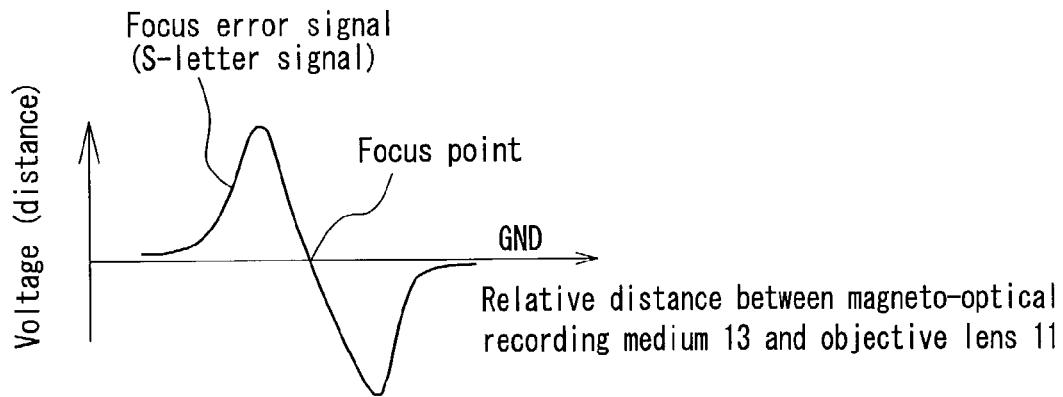
FIG. 7 is a view showing a configuration of the focus servo of the optical head according to the first embodiment.
Figure 7B:
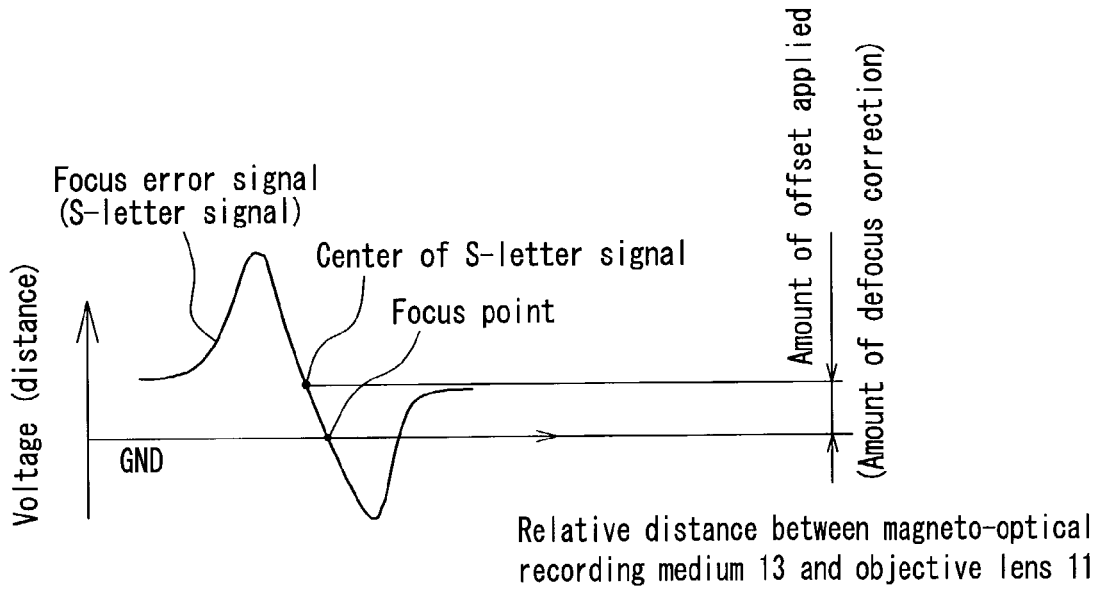

On the other hand, FIGS. 7A and 7B show the focus servo of the optical head according to the first embodiment. In this configuration, the off-set amount to the GND with respect to the focus error signal calculated by the so-called SSD method and electric current corresponding to the off-set amount is applied to the coil 18b, and thereby the focus servo is converged around the GND. The focus error signal generates a so-called S-letter signal due to the change of the position in the focus direction of the objective lens 11 and the focus point of the objective lens 11 is converged around the GND of the focus error signal. At this time, the defocus amount is defined by the difference between substantially the center of the S-letter signal and the GND as shown in FIG. 7B.

Figure 9A:
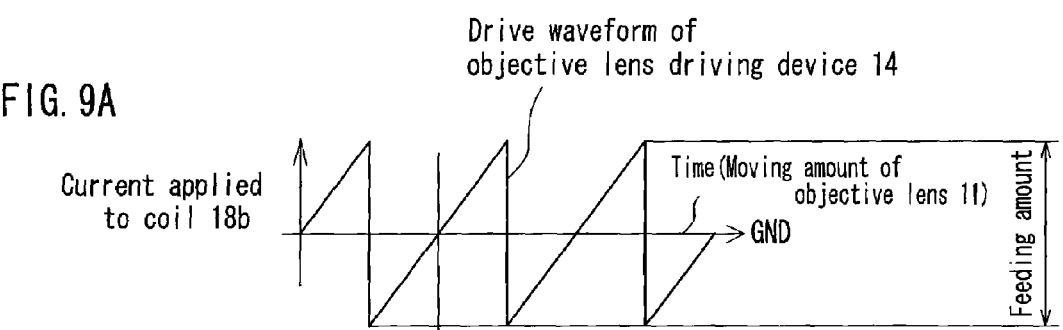
FIG. 9 is a schematic view showing the relationship between the optical head and the operation of the optical head feeding apparatus according to the first embodiment.
Figure 9B:
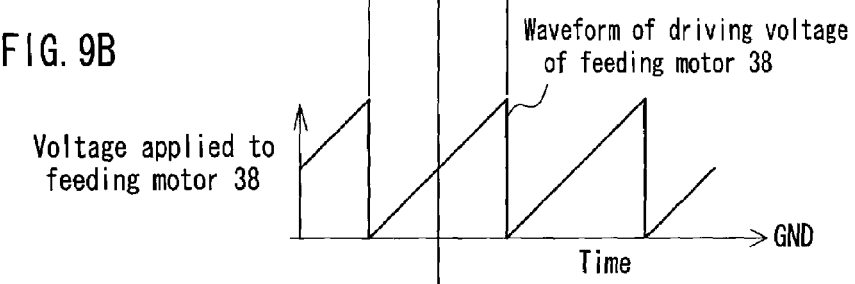
Figure 9C:
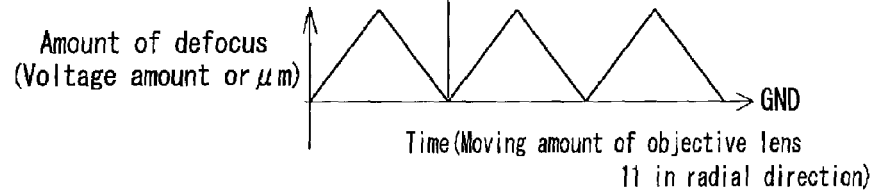

The defocus difference occurs because the amount of astigmatism of the optical spot 32 changes so as to change the shape of the optical spot 20 on the region 24 as the objective lens 11 moves in the radial direction. At this time, as shown in FIGS. 9A, 9B and 9C, the amount of defocus is the largest at the moment the feeding motor 38 starts to move. Furthermore, at this time, the direction of the defocus is the −direction (the direction in which the magneto-optical recording medium 13 and the objective lens 11 are distant from each other).

Figure 8A:
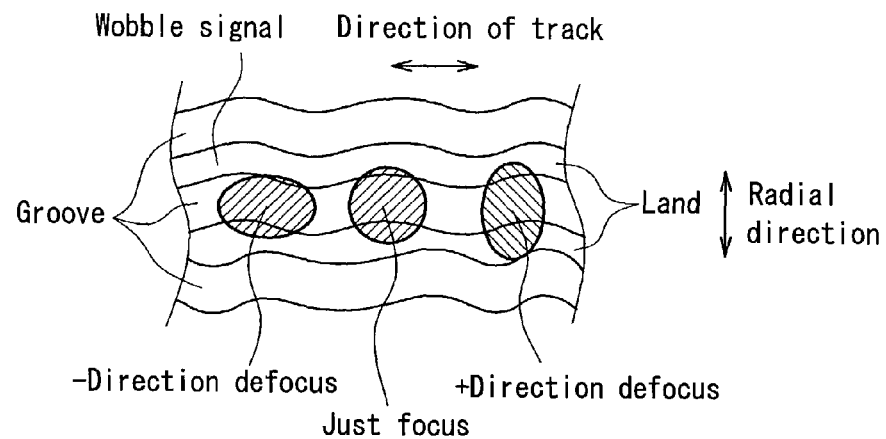
FIG. 8A is a schematic view showing a shape of the optical spot according to the first embodiment.
Figure 8B:
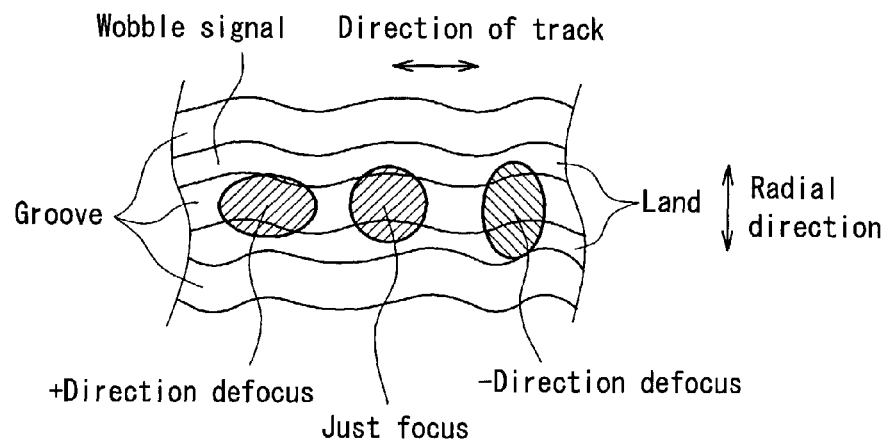
FIG. 8B is a schematic view showing a shape of an optical spot according to a comparative example.

FIGS. 8A and 8B are schematic views showing the shape of the optical spot 32 on the magneto-optical recording medium 13 when defocus occurs. FIG. 8A relates to this embodiment and FIG. 8B relates to the comparative example.

The details are shown later, however, in this embodiment, the optical spot has an initial astigmatism on the design optical axis and the direction of this astigmatism is a direction in which a back-side line focus is substantially perpendicular to the radial direction of the magneto-optical recording medium 13. Note here that the design optical axis herein denotes an axis equal to an optical axis of the objective lens 11 when the radial direction shift amount of the objective lens 11 is 0. When the objective lens 11 on the design optical axis is displaced, the optical axis of the objective lens 11 also is displaced from the design optical axis. The same is true in the following explanations.

Figure 12:
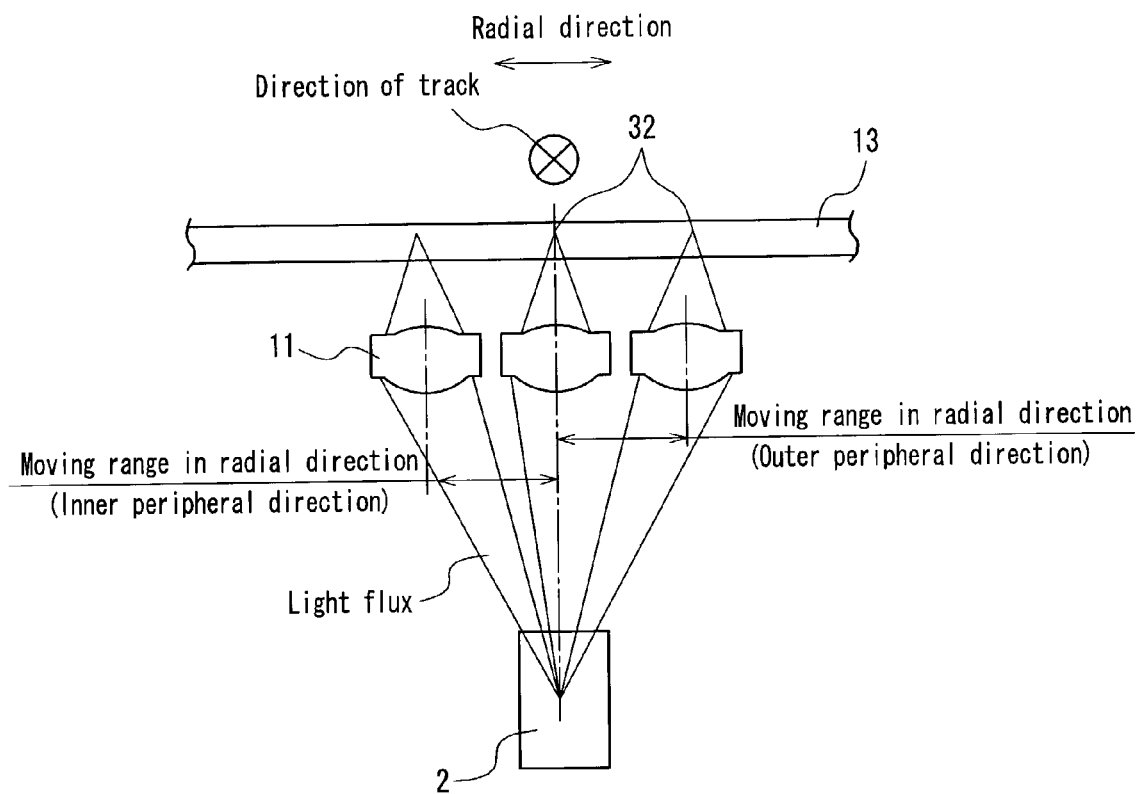
FIG. 12 is a schematic view showing a radial direction moving region of the optical head according to the first embodiment.

In this embodiment, since such an initial astigmatism is provided, when defocus occurs in the −direction, the optical spot becomes vertically-elongated in shape with respect the direction of the track (that is, the longitudinal axis of the oval shaped optical spot is along the direction of the track) as shown in FIG. 8A, the track adjacent to the desirable track does not tend to be irradiated with the optical spot, and thus it is not likely to be affected by cross-talk. Therefore, even if the defocus (in particular, defocus in the −direction) occurs in the region in which the objective lens 11 moves in the radial direction as shown in FIG. 12, stable recording and reproducing can be realized.

On the contrary, in the comparative example without having the above-mentioned initial astigmatism, as shown in FIG. 8B, when defocus occurs in the −direction, since the optical spot becomes a vertically elongated in the radial direction (that is, the longitudinal axis of the oval optical spot is along the radial direction), the adjacent tracks are likely to be irradiated with an optical spot.

Figure 10:
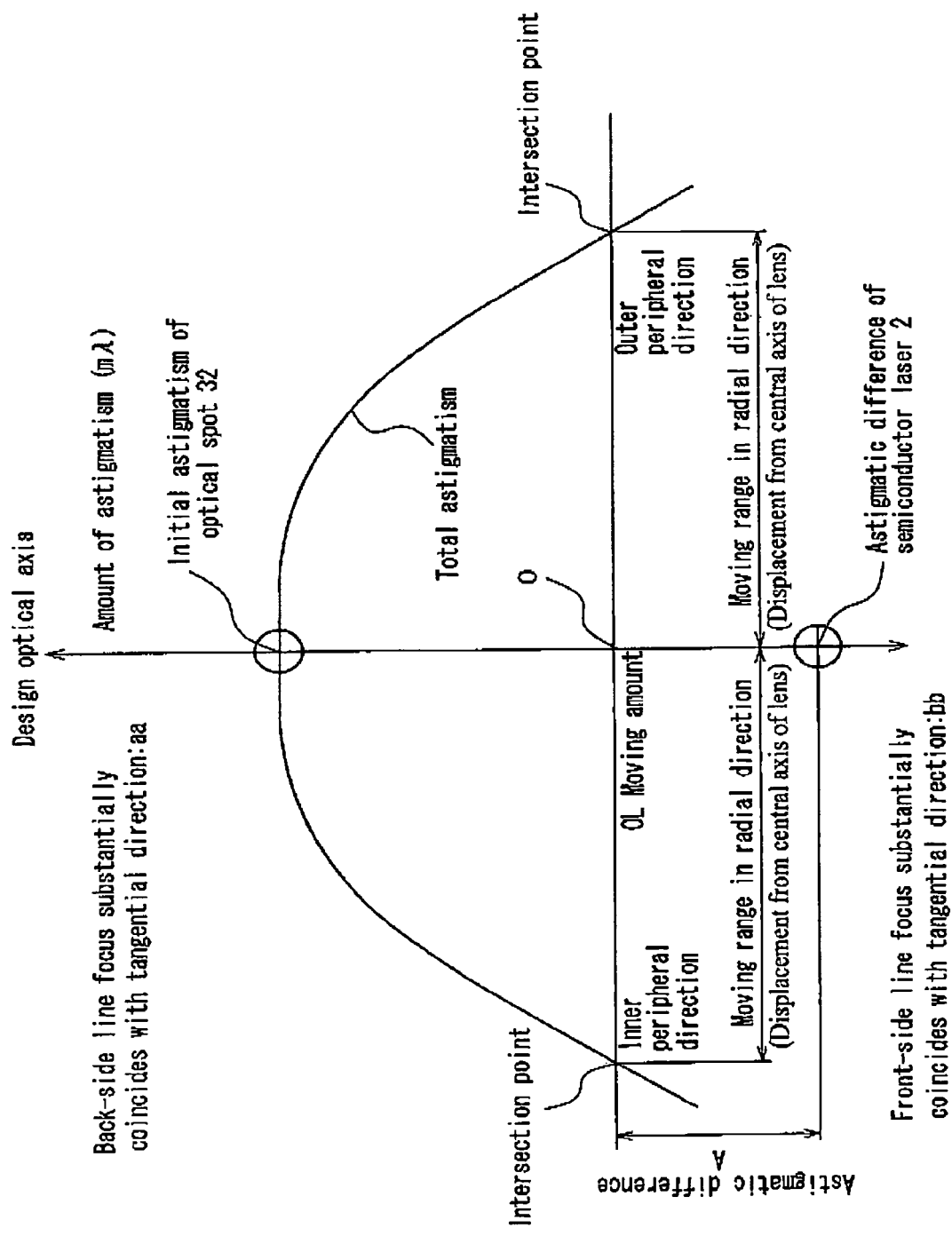
FIG. 10 is a schematic view showing the relationship between the direction of astigmatism of the optical head and the radial shift according to the first embodiment.

FIG. 10 shows the direction of astigmatism and astigmatic difference with respect to the magneto-optical recording medium 13 in the first embodiment. Furthermore, FIG. 1 is a schematic view showing an optical path. FIG. 1 shows two sets of combination of the objective lens 11 and the semi-conductor laser 2. The left side drawing shows the X-Y plane (horizontal side) and the right side drawing shows the X-Z plane (vertical side). The disk 13 is shown in order to show the direction of the track and the radial direction, and the position relationship with respect to the optical path is different from the actual relationship. Note here that the Z axis is also a direction of the optical axis.

The semiconductor laser 2 has a so-called astigmatic difference A that is a difference between a light emitting point in the X-Y plane (horizontal side) and a light emitting point (light emitting point on an end of the semiconductor end face) in the X-Z plane (vertical side). The direction of the astigmatic difference of the semiconductor laser 2 of the optical head is a direction shown in FIG. 1. In the configuration at this time, the light emitting point in the X-Z plane is close to the side of the objective lens 11. At the light spot 32, in the direction in which the interval between the magneto-optical recording medium 13 and the objective lens 11 is increased, the direction of longitudinal axis of the oval shape of the light spot 32 substantially perpendicular to the radial direction.

Furthermore, this astigmatic difference A is compressed by an amount converted by a vertical magnification β2 of the optical system to be astigmatism of the optical spot 32 that passed through the objective lens 11. At this time, a line focus at the focal position in the direction in which the objective lens 11 is closer to the magneto-optical recording medium 13 is defined as a front-side line focus and a line focus at the focal position in the direction in which the objective lens 11 is distant from the magneto-optical recording medium 13 is defined as a back-side line focus.

Furthermore, this astigmatic difference A is compressed by an amount converted by a vertical magnification β2 of the optical system to be astigmatism of the optical spot 32 that passed through the objective lens 11. At this time, a line focus at the focal position in the direction in which the objective lens 11 is closer to the magneto-optical recording medium 13 is defined as a front-side line focus and a line focus at the focal position in the direction in which the objective lens 11 is more distant from the magneto-optical recording medium 13 is defined as a back-side line focus.

Figure 11:
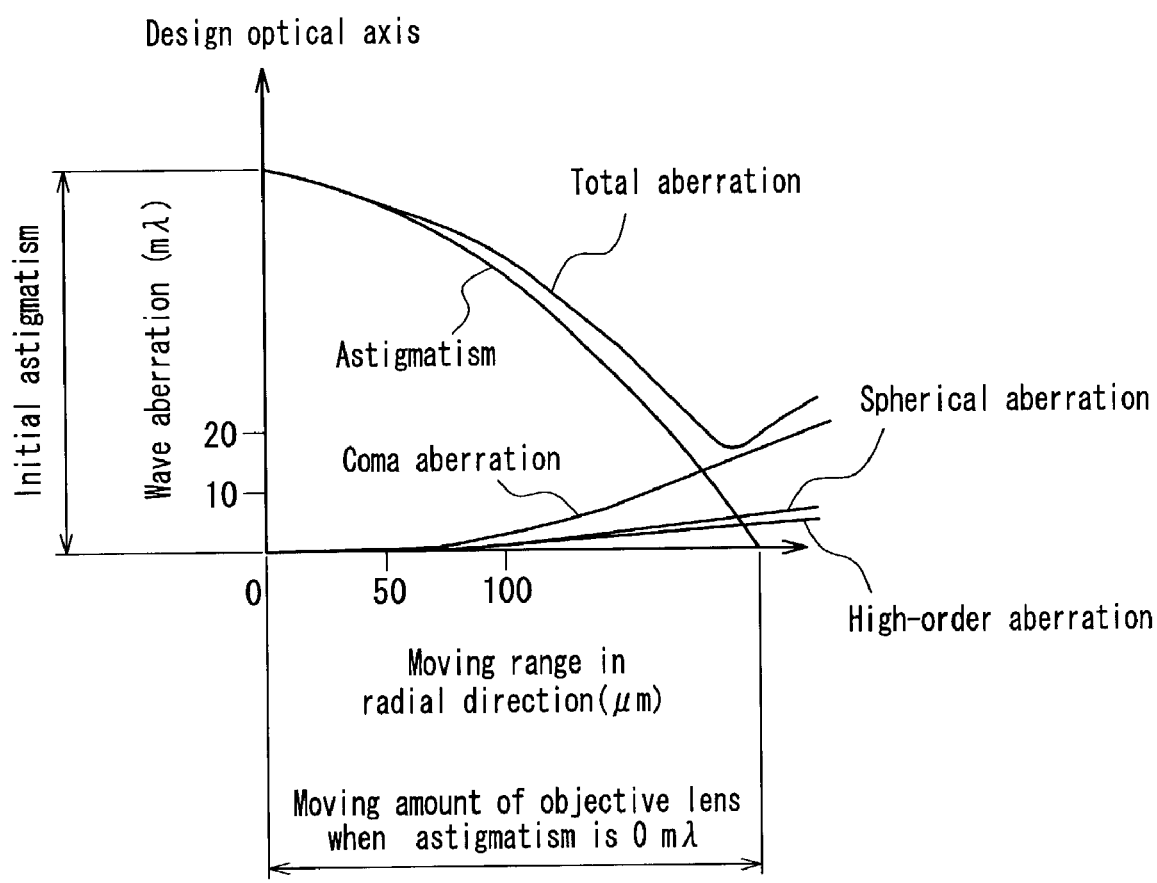
FIG. 11 is a schematic view showing the relationship between astigmatism of the optical head and wave aberration according to the first embodiment.

Herein, in this embodiment, as shown in FIGS. 10 and 11, initial astigmatism is provided on the design optical axis. The direction of this initial astigmatism is a direction in which the back-side line focus is substantially perpendicular to the radial direction of the recording medium 13 (the direction substantially coincides with the tangential direction), and as the objective lens 11 moves in the radial direction, astigmatism occurs in the direction in which the initial astigmatism is reduced.

Since in the off-axis aberration astigmatism is dominant, in the configuration in which astigmatism is reduced in accordance with the radial direction movement, as shown in FIG. 11, as the objective lens 11 moves in the radial direction, although the coma aberration, spherical aberration, and high-order aberration increase, the total aberration is reduced. In the first embodiment, the radial direction moving range of the objective lens 11 when astigmatism is 0 mλ is set to be 200 μm or more and 500 μm or less.

As mentioned above, the optical spot 32 has the initial astigmatism but the value thereof is determined by the astigmatism of the objective lens 11 on the design optical axis, the astigmatic difference of the semiconductor laser 2 and the astigmatism by the mirror 10 in the optical path, etc. (astigmatism of the objective lens 11 and the semiconductor laser 2 are dominant). Also, the value is determined by the amount of astigmatism generated in the radial direction moving range of the objective lens 11, the radial direction moving amount of the objective lens 11, and the direction of astigmatism of the optical spot 32 in the radial direction moving range of the objective lens 11.

In this embodiment, the correction of astigmatism, that is, as shown in FIG. 10, the property of having an initial astigmatism in the direction corresponding to the direction in which the back-side line focus substantially corresponds to the tangential direction of the magneto-optical recording medium 13, can be obtained by, for example, the shape of the objective lens 11. Specifically, a groove-shaped cut-off having a constant width in the radial direction of the surface at the disk side of the objective lens may be added, thereby correcting (adding) astigmatism by the increase of the focal position due to the cut-off. With this configuration of the objective lens, seen from the objective lens from the direction of the optical axis, a groove passing the optical axis is formed so that it crosses one surface of the lens.

At this time, when the objective lens 11 shifts in the radial direction, the focal position in the radial direction moves toward the position that is more distant from the disk commonly by the distortion of the image surface. Consequently, the properties as shown in FIG. 10 can be obtained, that is, astigmatism occurs in the direction in which the initial astigmatism is cancelled as moving in the radial direction, and thus astigmatism of the optical spot reduces and then the astigmatism becomes 0 in the predetermined radial direction moving amount.

In the first embodiment, since the objective lens 11 is an ultra-thin type, the amount of astigmatism occurring in the radial direction moving range is large, and the initial astigmatism of the optical spot 32 is set to be 30 mλ or more and 100 mλ or less and the amount of astigmatism of the objective lens 11 occurring in the radial direction moving range is set to be 30 mλ or more and 100 mλ or less by taking the astigmatic difference A of the semiconductor laser 2 into account.

Furthermore, the direction of astigmatism in the radial direction moving range (the initial astigmatism is reduced due to the off-axis aberration) is always the direction represented by aa in FIG. 10. That is, even if the objective lens 11 moves in any of the outer peripheral direction or the inner peripheral direction, the direction of astigmatism is a direction in which the back-side line focus is substantially perpendicular to the radial direction (back-side line focus substantially coincides with the tangential direction). And even if the objective lens moves either in the outer peripheral direction or inner peripheral direction, the initial astigmatism of the optical spot is reduced.

Herein, by setting the direction of astigmatism in which the back-side line focus is substantially perpendicular to the radial direction is set to be the direction aa, the direction of astigmatism of the optical spot 32 is set to be a direction in which the shorter axis of the oval shape of the optical spot 32 substantially coincides with The radial direction in the direction (–direction) in which the optical recording medium 13 is more distant from the objective lens 11.

Thus, when the objective lens 11 moves in the radial direction during recording or reproducing information, even if the defocus occurs in the –direction when astigmatism is in the direction aa, the shorter axis of the optical spot 32 substantially coincides with the radial direction. Therefore, cross-talk of the reproduced signal and the Adip signal that becomes an address signal can be detected with high precision without being influenced by the cross talk.

Therefore, since the direction of astigmatism is the direction aa in the radial direction moving range of the objective lens 11 at the time of recording and reproducing information, the amount of the initial astigmatism is determined by the amount of off-axis aberration (astigmatism) of the objective lens 11. Furthermore, in general, during the radial direction movement, due to some adverse conditions such as the increase of off-axis aberration and the tilt of the objective lens 11, etc, the recording and reproducing conditions are deteriorated, and the reading performance of the reproducing signal and the detection performance of the Adip signal are deteriorated radically. From the viewpoint of the consumption of electric power, it is desirable that the objective lens 11 moves in the radial direction as much as possible. And by the performance of the optical head during the moving in the radial direction, the moving amount in the radial direction is determined. Accordingly, in the off-axis, by setting the initial astigmatism and the direction in which the initial astigmatism of the objective lens 11 occurs to the direction in which astigmatism is reduced, it is possible to increase the radial direction moving amount.

Furthermore, by setting the direction of astigmatism on the design axis to be the direction aa, due to the influence of the rim strength and astigmatism, the optical spot 32 that is narrowed in the tangential direction can be formed. Thus, the performance of detecting signals recorded on the information recording medium is improved, and the reproducing jitter and Adip detection performance can radically be improved.

As mentioned above, according to the first embodiment, by specifying the direction of astigmatism of the optical spot 32 released from the objective lens 11, aberration amount and radial direction range (moving amount), even if the objective lens 11 moves significantly on the design optical axis and in the radial direction, stable recording and reproducing signals can be obtained, and further stable detection of the Adip signals can be realized.

Furthermore, since it is possible to make the objective lens 11 to be smaller and thinner, it is possible to make the optical head to be smaller and thinner. Therefore, the recording and reproducing performance of the disk recording and reproducing apparatus can be improved radically and the apparatus is made to be smaller and thinner.

Furthermore, since it is possible to reduce the influence of astigmatism (off-axis aberration) when moving in the radial direction, it is possible to increase the maximum value of the radial direction moving amount of the objective lens. Therefore, the intermittency (rate of the non-operation time) of the feeding motor 38 is improved so that battery lifetime can be improved radically.

Furthermore, on the design optical axis, by providing the initial astigmatism and sacrificing somewhat performance of recording and reproducing information on the design optical axis and power margin, recording and reproducing are carried out while reducing astigmatism (off-axis aberration) even at the time of shifting in the radial direction in which the recording and reproducing conditions and power margin are deteriorated due to the tilt of the objective lens 11 or off-axis aberration. Therefore, it is possible to secure the stable recording and reproducing performance and power margin in the entire region of the radial direction moving range and it is possible to realize the stable disk recording and reproducing apparatus. In addition, it is possible to make the objective lens to be small and thin, and therefore it is possible to make the optical head to be small and thin. As a result, it is possible to make the disk recording and reproducing apparatus to be small and thin.

Note here that in the first embodiment, the direction of astigmatism of the semiconductor laser 2 is set to be the direction bb. But, needless to say, it may be 0 or aa as long as the amount and direction of the initial astigmatism of the optical spot 32 are taken into account.

Furthermore, in the first embodiment, in the design optical axis, astigmatism of the objective lens 11 is set to be the direction aa and astigmatism of the semiconductor laser 2 is set to be the direction bb. However, as long as the amount and direction of the initial astigmatism on the optical spot 32 in design optical axis are the same as the predetermined values, the directions and amount of astigmatism of the objective lens 11 and the semiconductor laser 2 are not particularly limited. In this embodiment, in the case where the semiconductor laser 2 only for reproducing is used, the value of bb reaches about 25 m$\lambda$. Therefore, if astigmatism of the optical spot 32 is set to 30 m$\lambda$ or more, the amount of astigmatism to be added to the objective lens 11 should be 50 m$\lambda$ or more in the direction of aa. Furthermore, in the case where a high output recording and reproducing semiconductor laser 2 is used, the value of bb becomes approximately 0 m$\lambda$.

Furthermore, the configuration may include an optical head feeding device capable of driving the feeding motor 38 so as to carry out an intermittent feeding so that the radial direction moving amount of the objective lens 11 becomes a predetermined value or a value in the predetermined range.

At this time, a means for detecting the radial direction moving amount carries out the calculation by using the value of the electric current of the coil 18b or by using a part of the tracking error signal.

Furthermore, the case where the optical system is a finite system was explained above as an example, however, the optical system may be a pseudo-finite system.

Second Embodiment

Figure 13:
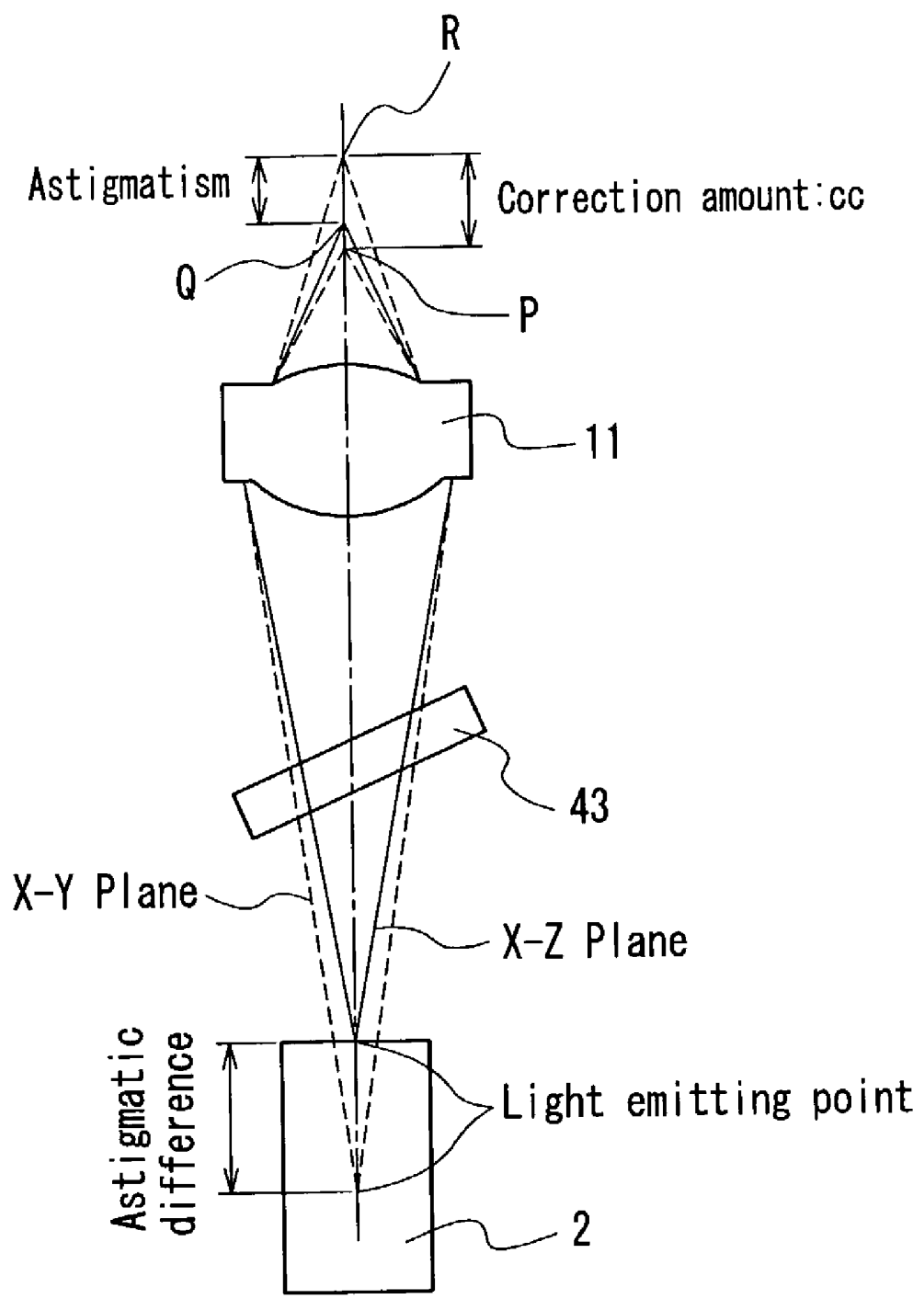
FIG. 13 is a schematic view showing an optical path of the optical head according to a second embodiment.
Figure 14:
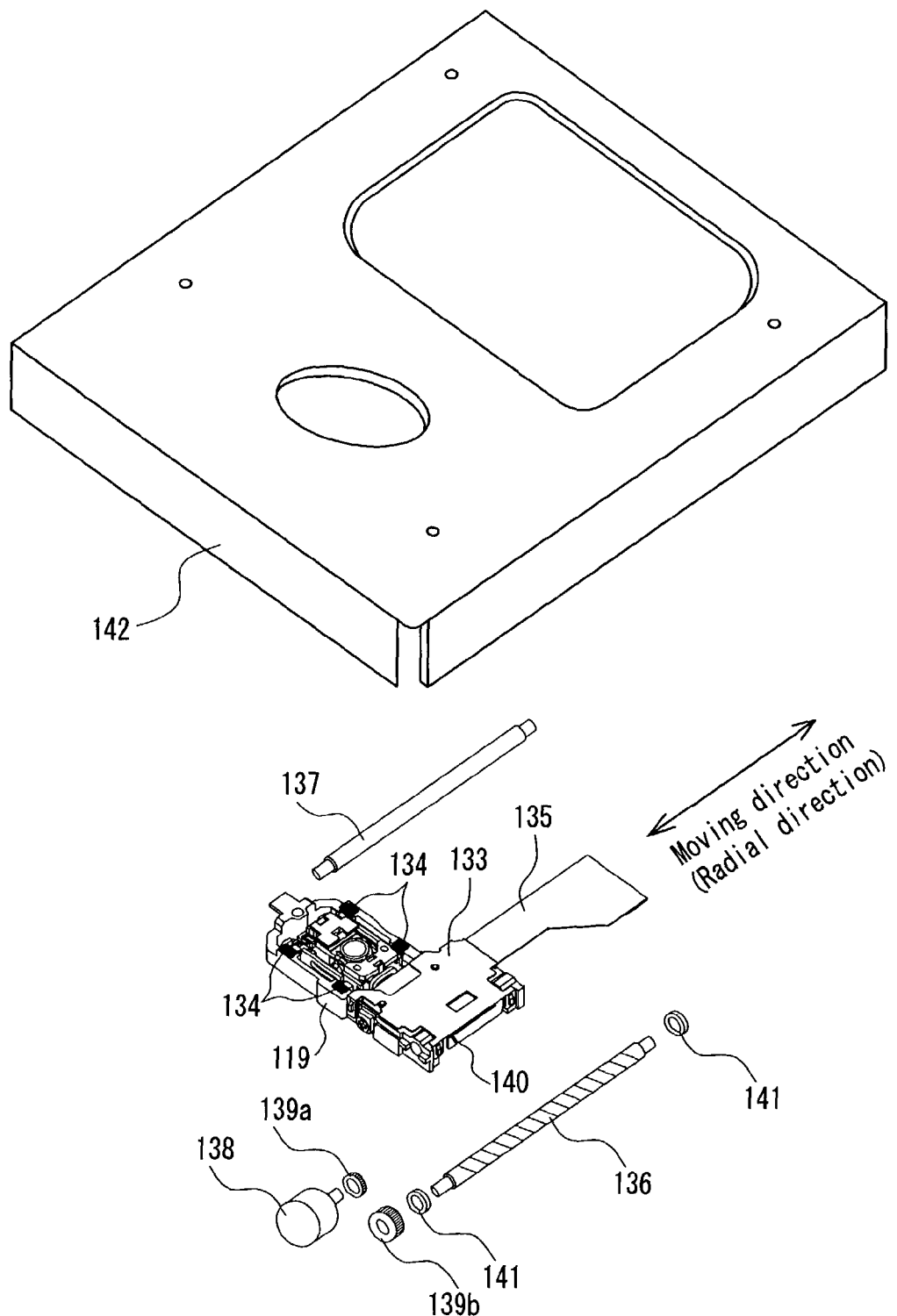
FIG. 14 is a schematic perspective view showing an optical head and an optical head feeding apparatus according to the prior art.
Figure 15:
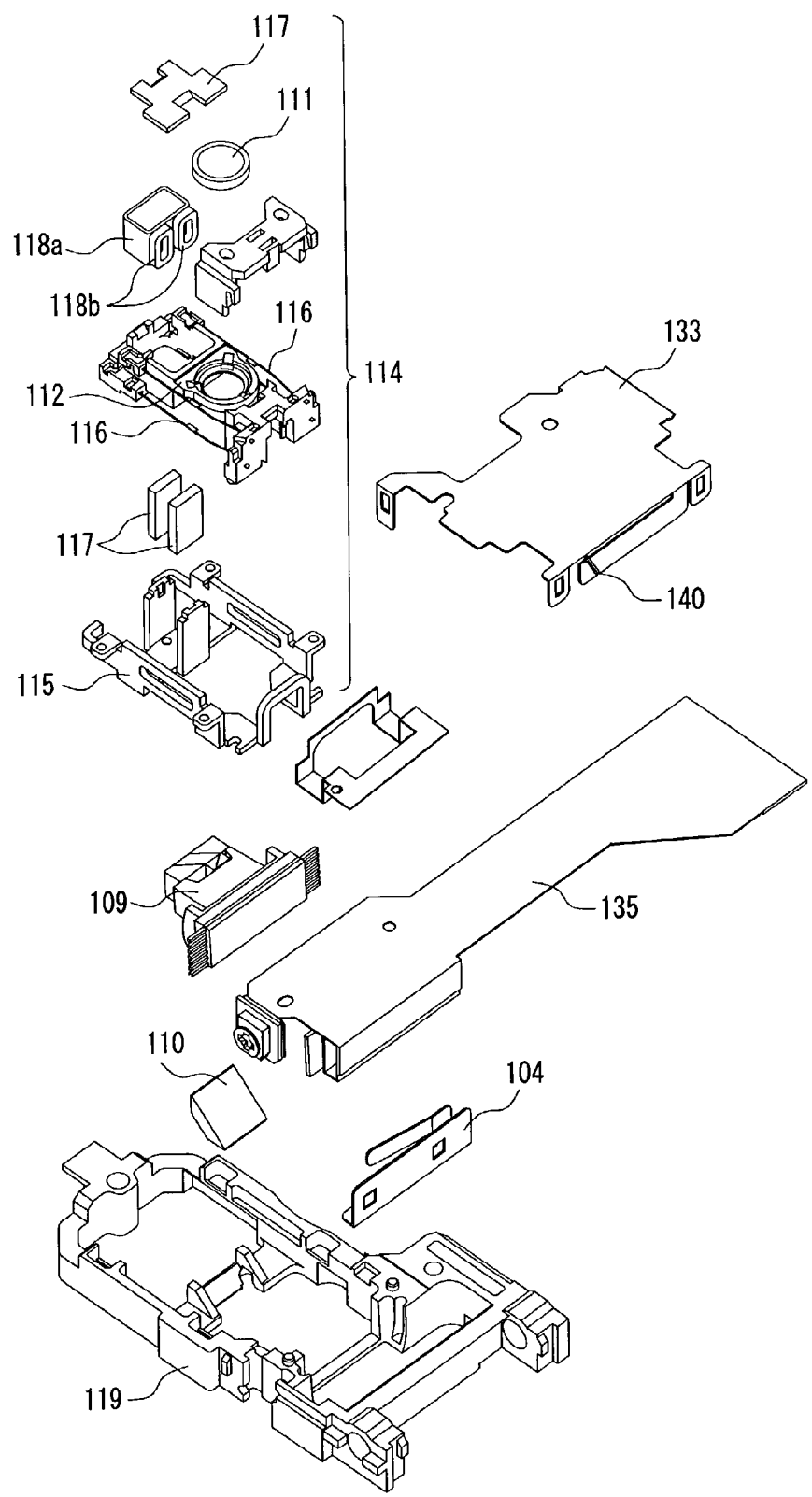
FIG. 15 is an exploded perspective view showing a configuration of a conventional optical head according to the prior art.
Figure 16B:
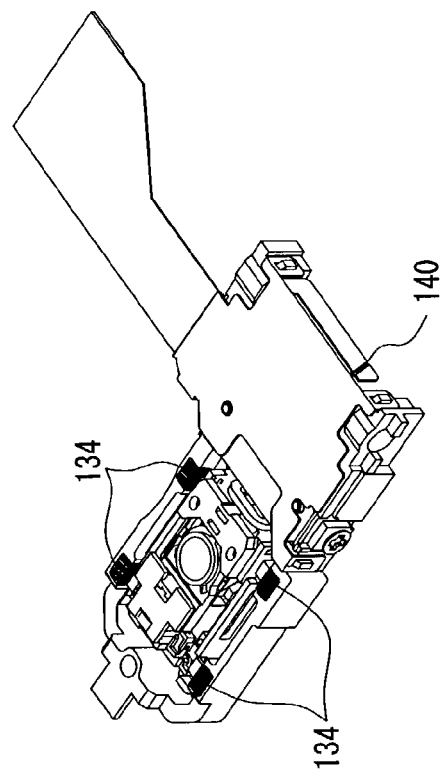
FIG. 16 is a perspective view showing a method for adjusting an optical head according to the prior art.
Figure 16A:
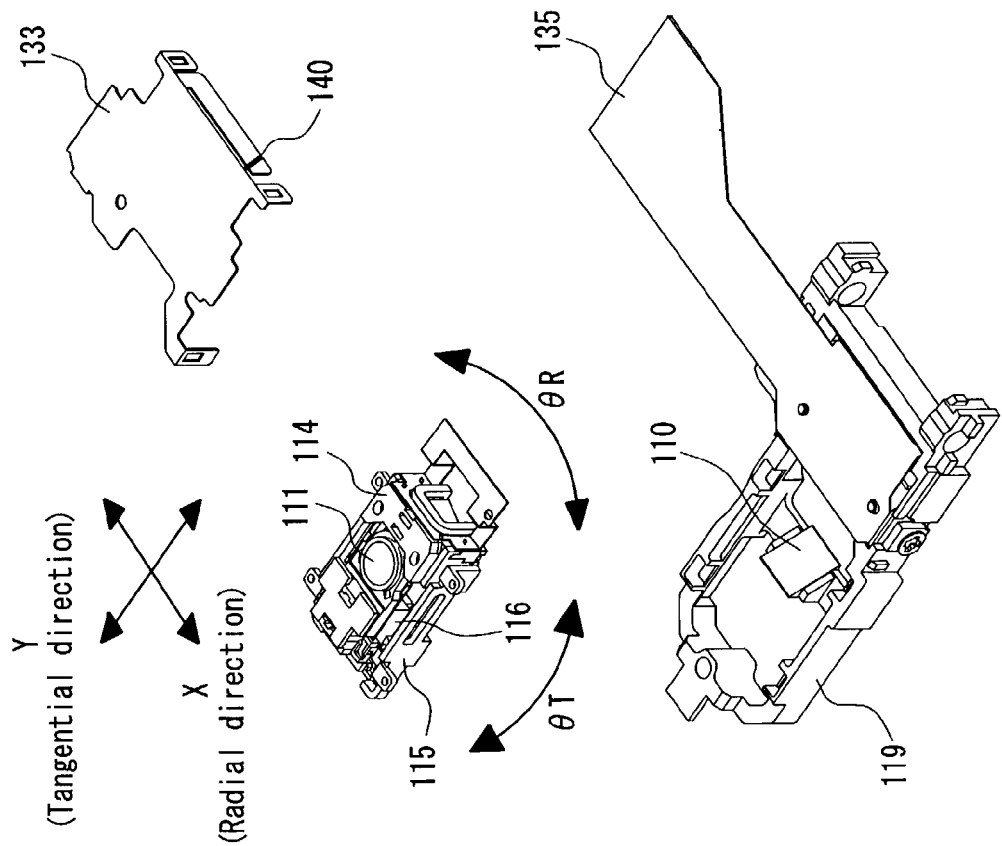
Figure 18:
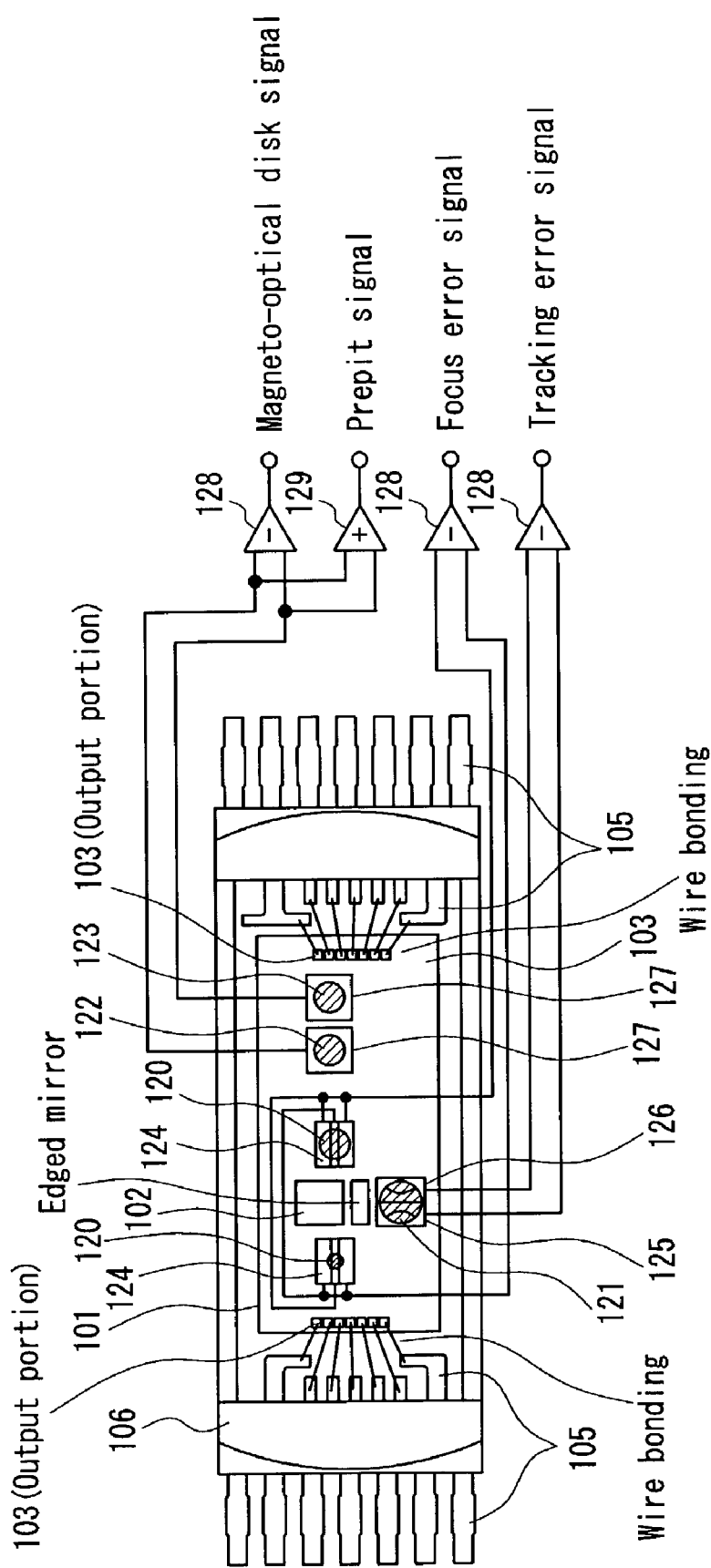
FIG. 18 is a schematic view showing a light receiving and emitting element of an optical head according to the prior art.
Figure 19A:
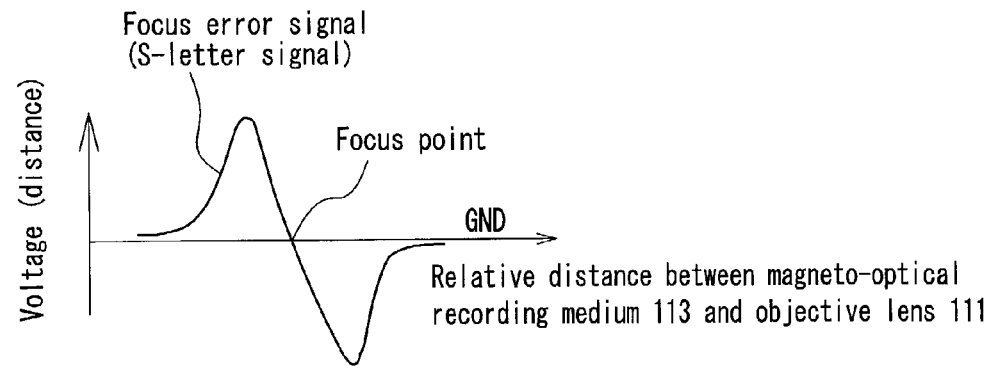
FIG. 19 is a schematic view showing a configuration of the focus servo of an optical head according to the prior art.
Figure 19B:
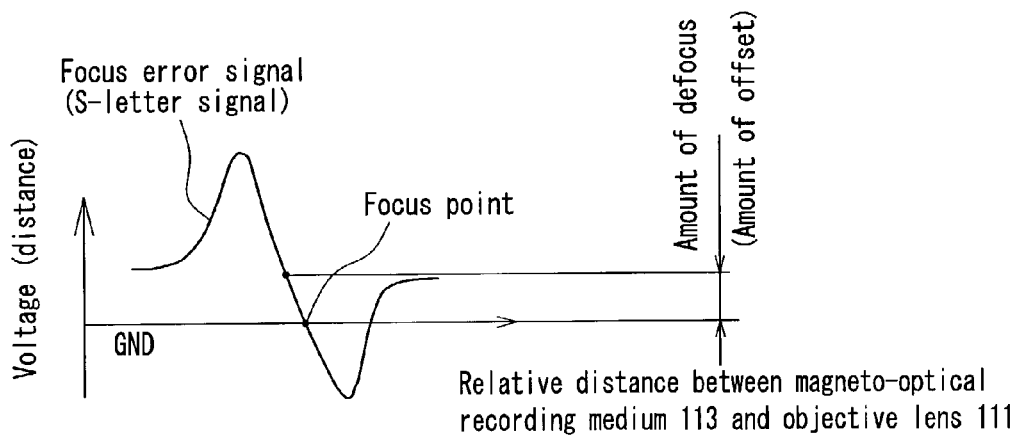
Figure 20A:
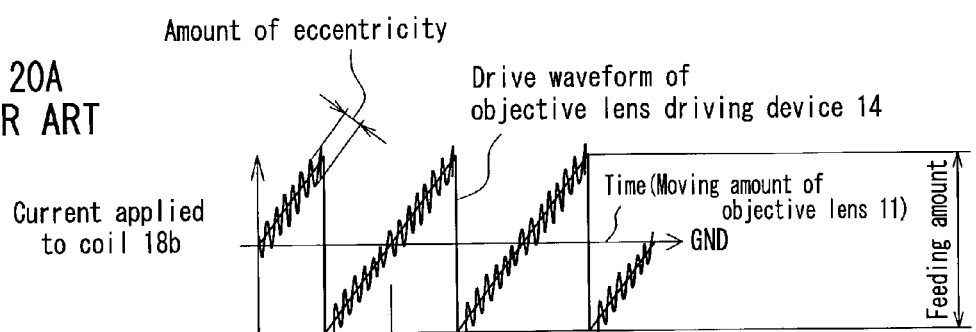
FIG. 20 is a schematic view showing the relationship between the operation of an optical head and an optical head feeding apparatus according to the prior art.
Figure 20B:
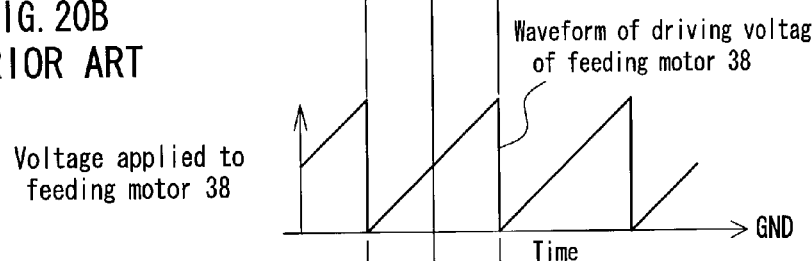
Figure 20C:
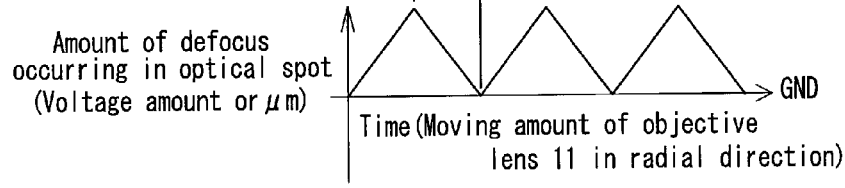
Figure 21:
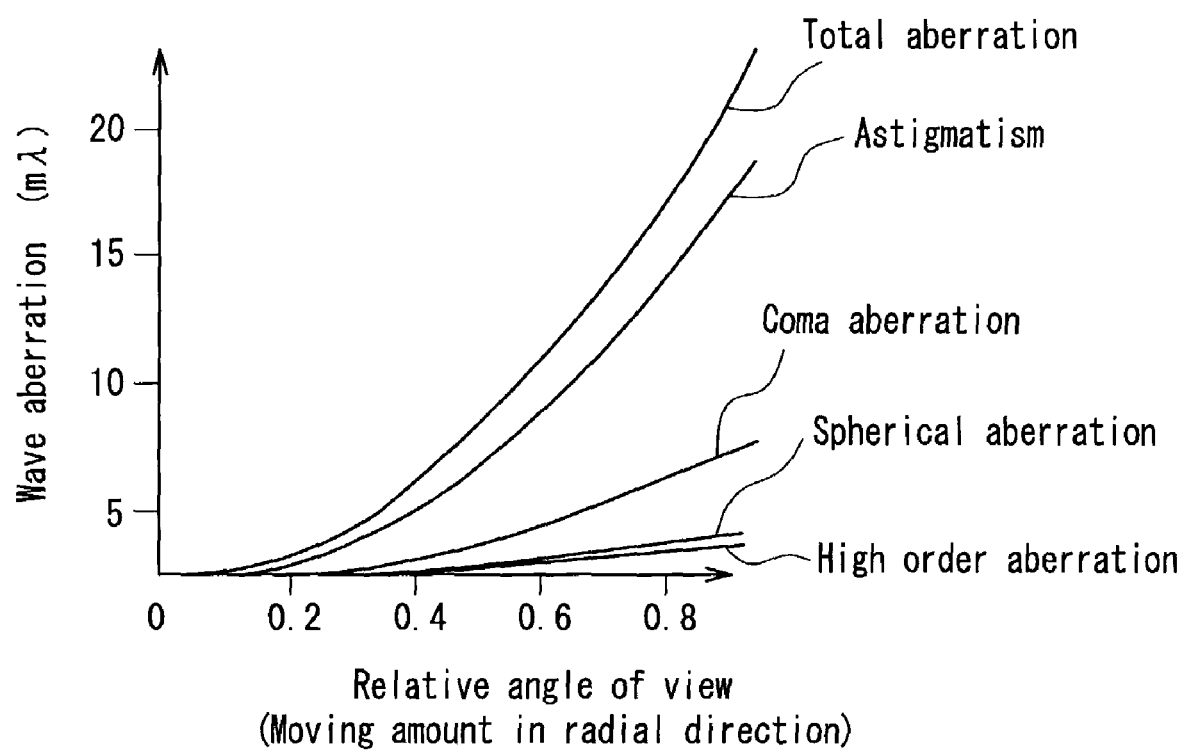
FIG. 21 is a schematic view showing the relationship between astigmatism of the optical head and the wave aberration according to the prior art.

Next, the second embodiment will be explained with reference to FIG. 13. The difference between the first embodiment and the second embodiment is in that the initial astigmatism is given by a flat-shaped glass 43. This flat-shaped glass 43 is disposed obliquely in the light flux, thereby generating astigmatism. With this astigmatism, the amount cc of astigmatism correction is added to P that is a focus in the X-Y plane so as to move the position of R, and thereby astigmatism of Q-R is generated. Consequently, the direction of astigmatism is changed.

As compared with the case where the objective lens 11 is provided with astigmatism, this method can apply the appropriate correction amount cc more easily and with higher precision only by changing the angle of the flat-shaped glass 43.

Note here that in the second embodiment, the initial astigmatism is not applied to the objective lens 11. However, the initial astigmatism may be applied by both the flat-shaped glass 43 and the objective lens 11.

Furthermore, in the second embodiment, as the method for applying astigmatism, the flat-shaped glass 43 is used. However, needless to say, a lens formed of cylindrical surfaces having a lens effect in only one direction may be used.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical head comprising a finite or pseudo-finite optical system comprising a light source having astigmatic difference and an objective lens that forms an optical spot on an information recording medium by a light flux emitted from the light source, and an objective lens driving device for driving the objective lens in a radial direction, wherein
the optical system has optical properties in that the optical spot has an initial astigmatism on the design optical axis, the direction of the initial astigmatism is a direction in which a back-side line focus is substantially perpendicular to the radial direction of the information recording medium, and astigmatism is generated in the direction in which the initial astigmatism of the optical spot is reduced as the objective lens moves in the direction in which the objective lens is more distant from the design optical axis in the radial direction, and
the direction of astigmatism of the optical spot farmed by the objective lens is a direction in which a back-side line focus is substantially perpendicular to the radial direction in the radial direction movement range of the objective lens.

2. The optical head according to claim 1, wherein the objective lens adds astigmatism so as to obtain the initial astigmatism.

3. The optical head according to claim 1, further comprising an astigmatism generating member between the light source and the objective lens, wherein the astigmatism generating member adds astigmatism so as to obtain the initial astigmatism.

4. The optical head according to claim 1, wherein the initial astigmatism is in the range of 30 m$\lambda$ or more and 100 m$\lambda$ or less.

5. The optical bead according to claim 1, wherein the absolute value of the radial direction movement range of the objective lens is in the range of 200 $\mu$m or more and 500 $\mu$m or less.

6. The optical head according to claim 1, wherein the changing amount of astigmatism generated in the movement amount in the radial direction movement range of the objective lens is in the range of 30 m$\lambda$ or more and 100 m$\lambda$ or less.

7. The optical head according to claim 1, wherein the light source comprises a semiconductor laser, and the direction of astigmatism of the optical spat emitted from the semiconductor laser is a direction in which a front-side line focus is substantially perpendicular to the radial direction.

8. The optical head according to claim 1, wherein the objective lens is a single lens formed of resin or glass, and the direction of astigmatism of the optical spot released from the objective lens on the design optical axis is a direction in which a back-side line focus is substantially perpendicular to the radial direction.

9. The optical bead according to claim 3, wherein the objective lens is a single lens formed of resin or glass, and the direction of astigmatism of the optical spot generated by the astigmatism generating member on the design optical axis is a direction in which a back-side line focus is substantially perpendicular to the radial direction.

10. The optical head according to claim 3, wherein the astigmatism generating member is a flat-shaped glass or a cylindrical-shaped lens.

11. A disk recording and reproducing apparatus comprising the optical head according to claim 1 and an optical head feeding device carrying out an intermittent feeding so that the radial direction movement amount of the objective lens falls in a predetermined radial direction movement range.

12. The disk recording and reproducing apparatus according to claim 11, further comprising a feeding amount detector of the objective lens in the radial direction, wherein the feeding amount detector carries out an intermittent feeding when the movement amount reaches the predetermined movement amount.

13. The disk recording and reproducing apparatus according to claim 12, wherein the calculation of the feeding amount detector uses a part of the tracking error signals.

14. The disk recording and reproducing apparatus according to claim 12, wherein the calculation of the feeding amount detector uses the applied current of the objective lens driving device for driving the objective lens in the radial direction.

15. A disk recording and reproducing apparatus comprising the optical head according to claim 2 and an optical head feeding device carrying out an intermittent feeding so that the radial direction movement amount of the objective lens falls in a predetermined radial direction movement range.

16. A disk recording and reproducing apparatus comprising the optical head according to claim 3 and an optical head feeding device carrying out an intermittent feeding so that the radial direction movement amount of the objective lens falls in a predetermined radial direction movement range.

17. A disk recording and reproducing apparatus comprising the optical head according to claim 4 and an optical head feeding device carrying out an intermittent feeding so that the radial direction movement amount of the objective lens falls in a predetermined radial direction movement range.

18. A disk recording and reproducing apparatus comprising the optical head according to claim 5 and an optical head feeding device carrying out an intermittent feeding so that the radial direction movement amount of the objective lens falls in the radial direction movement range.

19. A disk recording and reproducing apparatus comprising the optical head according to claim 6 and an optical head feeding device carrying out an intermittent feeding so that the radial direction movement amount of the objective lens falls in a predetermined radial direction movement range.

20. A disk recording and reproducing apparatus comprising the optical head according to claim 7 and an optical head feeding device carrying cut an intermittent feeding so that the radial direction movement amount of the objective lens falls in a predetermined radial direction movement range.

21. A disk recording and reproducing apparatus comprising the optical head according to claim 8 and an optical head feeding device carrying out an intermittent feeding so that the radial direction movement amount of the objective lens falls in a predetermined radial direction movement range.

22. A disk recording and reproducing apparatus comprising the optical head according to claim 9 and an optical head feeding device carrying out an intermittent feeding so that the radial direction movement amount of the objective lens falls in a predetermined radial direction movement range.

23. A disk recording and reproducing apparatus comprising the optical head according to claim 10 and an optical head feeding device carrying out an intermittent feeding so that the radial direction movement amount of the objective lens fails in a predetermined radial direction movement range.

* * * * *

UNITED STATES PATENT AND TRADEMARK OFFICE
CERTIFICATE OF CORRECTION

PATENT NO. : 7,061,834 B2
APPLICATION NO. : 10/293690
DATED : June 13, 2006
INVENTOR(S) : Nakata et al.

It is certified that error appears in the above-identified patent and that said Letters Patent is hereby corrected as shown below:

Column 16, line 6(claim 1): "farmed" should read --formed--
Column16, line 22(claim 5): "bead" should read --head--
Column 16, line 33(claim 7): "spat" should read --spot--
Column 18, line 5(claim 20): "cut" should read --out--

Signed and Sealed this

Sixth Day of March, 2007

JON W. DUDAS
*Director of the United States Patent and Trademark Office*